US012160758B2

(12) United States Patent
Hmimy et al.

(10) Patent No.: US 12,160,758 B2
(45) Date of Patent: Dec. 3, 2024

(54) CONTROL OF COMMUNICATION DEVICES IN A WIRELESS NETWORK

(71) Applicant: Charter Communications Operating, LLC, St. Louis, MO (US)

(72) Inventors: Hossam H. Hmimy, Aurora, CO (US); Umamaheswar A. Kakinada, Greenwood Vilage, CO (US); Muhammad J. Khan, Greenwood Village, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 303 days.

(21) Appl. No.: 17/688,014

(22) Filed: Mar. 7, 2022

(65) Prior Publication Data
US 2023/0284042 A1    Sep. 7, 2023

(51) Int. Cl.
*H04W 24/02*    (2009.01)
*H04W 24/04*    (2009.01)
*H04W 88/16*    (2009.01)

(52) U.S. Cl.
CPC .......... *H04W 24/02* (2013.01); *H04W 24/04* (2013.01); *H04W 88/16* (2013.01)

(58) Field of Classification Search
CPC ...... H04W 24/02; H04W 24/04; H04W 88/16
See application file for complete search history.

(56) References Cited

U.S. PATENT DOCUMENTS

| 10,868,895 | B2* | 12/2020 | Wouhaybi | H04L 67/1051 |
| 2020/0322820 | A1* | 10/2020 | Carter | H04L 43/50 |
| 2020/0382973 | A1* | 12/2020 | Cardozo | G01R 31/08 |
| 2020/0396623 | A1* | 12/2020 | Kakinada | H04L 41/0654 |
| 2021/0084618 | A1* | 3/2021 | Bienas | H04L 1/1812 |
| 2022/0131747 | A1* | 4/2022 | Sevindik | H04W 28/0268 |
| 2022/0264285 | A1* | 8/2022 | Palli | H04W 12/40 |
| 2023/0117081 | A1* | 4/2023 | Hunter | G06F 8/60 |
| | | | | 709/226 |

FOREIGN PATENT DOCUMENTS

| EP | 4040414 A1 * | 8/2022 | G08B 29/126 |
| WO | WO-2022165089 A1 * | 8/2022 | H04W 24/04 |

* cited by examiner

*Primary Examiner* — Deepa Belur
(74) *Attorney, Agent, or Firm* — Armis IP Law, LLC

(57) ABSTRACT

A device management resource detects an anomaly event associated with a first communication device based on analysis of first feedback from multiple network entities supporting conveyance of communications associated with the first communication device. The device management resource selects an operational state of the first communication device based on the detected anomaly event. The device management resource then notifies each of the network entities of the selected operational state of the first communication device. Each of the network entities collects and forwards different feedback data associated with the first communication device depending on the selected operational state of the first communication device.

34 Claims, 20 Drawing Sheets

PROVISIONED MODE (GATEWAY)
CP-P-GW ..... FOR EACH DEVICE IN PROVISIONED MODE:
  A) PRODUCE FEEDBACK FB1-1 BASED ON MONITORED PARAMS P1 ASSOCIATED WITH POLICY CP-P-GW
  B) APPLY CONTROL FCNS TO DEVICES ACCORDING TO POLICY CP-P-GW (JOIN SERVER)
CP-P-JS..... FOR EACH DEVICE IN PROVISIONED MODE:
  A) PRODUCE FEEDBACK FB4-1 BASED ON MONITORED PARAMS P4 ASSOCIATED WITH POLICY CP-P-JS
  B) APPLY CONTROL FCNS TO DEVICES ACCORDING TO POLICY CP-P-JS (NETWORK SERVER)
CP-P-NS..... FOR EACH DEVICE IN PROVISIONED MODE:
  A) PRODUCE FEEDBACK FB5-1 BASED ON MONITORED PARAMS P5 ASSOCIATED WITH POLICY CP-P-NS
  B) APPLY CONTROL FCNS TO DEVICES ACCORDING TO POLICY CP-P-NS (AUTHENTICATION SERVER - SA)
CP-P-SA..... FOR EACH DEVICE IN PROVISIONED MODE:
  A) PRODUCE FEEDBACK FB6-1 BASED ON MONITORED PARAMS P6 ASSOCIATED WITH POLICY CP-P-SA
  B) APPLY CONTROL FCNS TO DEVICES ACCORDING TO POLICY CP-P-SA (APPLICATION SERVER - AS)
CP-P-AS..... FOR EACH DEVICE IN PROVISIONED MODE:
  A) PRODUCE FEEDBACK FB7-1 BASED ON MONITORED PARAMS P7 ASSOCIATED WITH POLICY CP-P-AS
  B) APPLY CONTROL FCNS TO DEVICES ACCORDING TO POLICY CP-P-AS

CONFIGN SETTINGS
183-P

FIG. 7

ACTIVE MODE

(GATEWAY)
CP-A-GW ..... FOR EACH DEVICE IN ACTIVE MODE:
  A) PRODUCE FEEDBACK FB1-2 BASED ON MONITORED PARAMS ACT1 ASSOCIATED WITH POLICY CP-A-GW
  B) APPLY CONTROL FCNS TO DEVICES ACCORDING TO POLICY CP-A-GW

(JOIN SERVER)
CP-A-JS...... FOR EACH DEVICE IN ACTIVE MODE:
  A) PRODUCE FEEDBACK FB4-2 BASED ON MONITORED PARAMS ACT4 ASSOCIATED WITH POLICY CP-A-JS
  B) APPLY CONTROL FCNS TO DEVICES ACCORDING TO POLICY CP-A-JS

(NETWORK SERVER)
CP-A-NS..... FOR EACH DEVICE IN ACTIVE MODE:
  A) PRODUCE FEEDBACK FB5-2 BASED ON MONITORED PARAMS ACT5 ASSOCIATED WITH POLICY CP-A-NS
  B) APPLY CONTROL FCNS TO DEVICES ACCORDING TO POLICY CP-A-NS

(AUTHENTICATION SERVER - SA)
CP-A-SA..... FOR EACH DEVICE IN ACTIVE MODE:
  A) PRODUCE FEEDBACK FB6-2 BASED ON MONITORED PARAMS ACT6 ASSOCIATED WITH POLICY CP-A-SA
  B) APPLY CONTROL FCNS TO DEVICES ACCORDING TO POLICY CP-A-SA

(APPLICATION SERVER - AS)
CP-A-AS..... FOR EACH DEVICE IN ACTIVE MODE:
  A) PRODUCE FEEDBACK FB7-2 BASED ON MONITORED PARAMS ACT7 ASSOCIATED WITH POLICY CP-A-AS
  B) APPLY CONTROL FCNS TO DEVICES ACCORDING TO POLICY CP-A-AS

CONFIGN SETTINGS 183-A

FIG. 10

TROUBLESHOOT MODE

(GATEWAY)
CP-T-GW ..... FOR EACH DEVICE IN TROUBLESHOOT MODE:
　　A) PRODUCE FEEDBACK FB1-3 AND FB2-3 BASED ON MONITORED PARAMS T1
　　　ASSOCIATED WITH POLICY CP-T-GW
　　B) APPLY CONTROL FCNS TO DEVICES ACCORDING TO POLICY CP-T-GW (JOIN SERVER)
CP-T-JS..... FOR EACH DEVICE IN TROUBLESHOOT MODE:
　　A) PRODUCE FEEDBACK FB4-3 BASED ON MONITORED PARAMS T4
　　　ASSOCIATED WITH POLICY CP-T-JS
　　B) APPLY CONTROL FCNS TO DEVICES ACCORDING TO POLICY CP-T-JS (NETWORK SERVER)
CP-T-NS..... FOR EACH DEVICE IN TROUBLESHOOT MODE:
　　A) PRODUCE FEEDBACK FB5-3 BASED ON MONITORED PARAMS T5
　　　ASSOCIATED WITH POLICY CP-T-NS
　　B) APPLY CONTROL FCNS TO DEVICES ACCORDING TO POLICY CP-T-NS (AUTHENTICATION SERVER - SA)
CP-T-SA..... FOR EACH DEVICE IN TROUBLESHOOT MODE:
　　A) PRODUCE FEEDBACK FB6-3 BASED ON MONITORED PARAMS T6
　　　ASSOCIATED WITH POLICY CP-T-SA
　　B) APPLY CONTROL FCNS TO DEVICES ACCORDING TO POLICY CP-T-SA (APPLICATION SERVER -AS)
CP-T-AS..... FOR EACH DEVICE IN TROUBLESHOOT MODE:
　　A) PRODUCE FEEDBACK FB7-3 BASED ON MONITORED PARAMS T7
　　　ASSOCIATED WITH POLICY CP-T-AS
　　B) APPLY CONTROL FCNS TO DEVICES ACCORDING TO POLICY CP-T-AS

CONFIGN SETTINGS
183-T

FIG. 13

QUARANTINE MODE

(GATEWAY)
CP-Q-GW ..... FOR EACH DEVICE IN TROUBLESHOOT MODE:
  A) PRODUCE FEEDBACK FB1 AND FB2 BASED ON MONITORED PARAMS Q1 ASSOCIATED WITH POLICY CP-Q-GW
  B) APPLY CONTROL FCNS TO DEVICES ACCORDING TO POLICY CP-Q-GW

(JOIN SERVER)
CP-Q-JS ..... FOR EACH DEVICE IN TROUBLESHOOT MODE:
  A) PRODUCE FEEDBACK FB4 BASED ON MONITORED PARAMS Q4 ASSOCIATED WITH POLICY CP-Q-JS
  B) APPLY CONTROL FCNS TO DEVICES ACCORDING TO POLICY CP-Q-JS

(NETWORK SERVER)
CP-Q-NS ..... FOR EACH DEVICE IN TROUBLESHOOT MODE:
  A) PRODUCE FEEDBACK FB5 BASED ON MONITORED PARAMS Q5 ASSOCIATED WITH POLICY CP-Q-NS
  B) APPLY CONTROL FCNS TO DEVICES ACCORDING TO POLICY CP-Q-NS

(AUTHENTICATION SERVER - SA)
CP-Q-SA ..... FOR EACH DEVICE IN TROUBLESHOOT MODE:
  A) PRODUCE FEEDBACK FB6 BASED ON MONITORED PARAMS Q6 ASSOCIATED WITH POLICY CP-Q-SA
  B) APPLY CONTROL FCNS TO DEVICES ACCORDING TO POLICY CP-Q-SA

(APPLICATION SERVER - AS)
CP-Q-AS ..... FOR EACH DEVICE IN TROUBLESHOOT MODE:
  A) PRODUCE FEEDBACK FB7 BASED ON MONITORED PARAMS Q7 ASSOCIATED WITH POLICY CP-Q-AS
  B) APPLY CONTROL FCNS TO DEVICES ACCORDING TO POLICY CP-Q-AS

CONFIGN SETTINGS
183-Q

FIG. 16

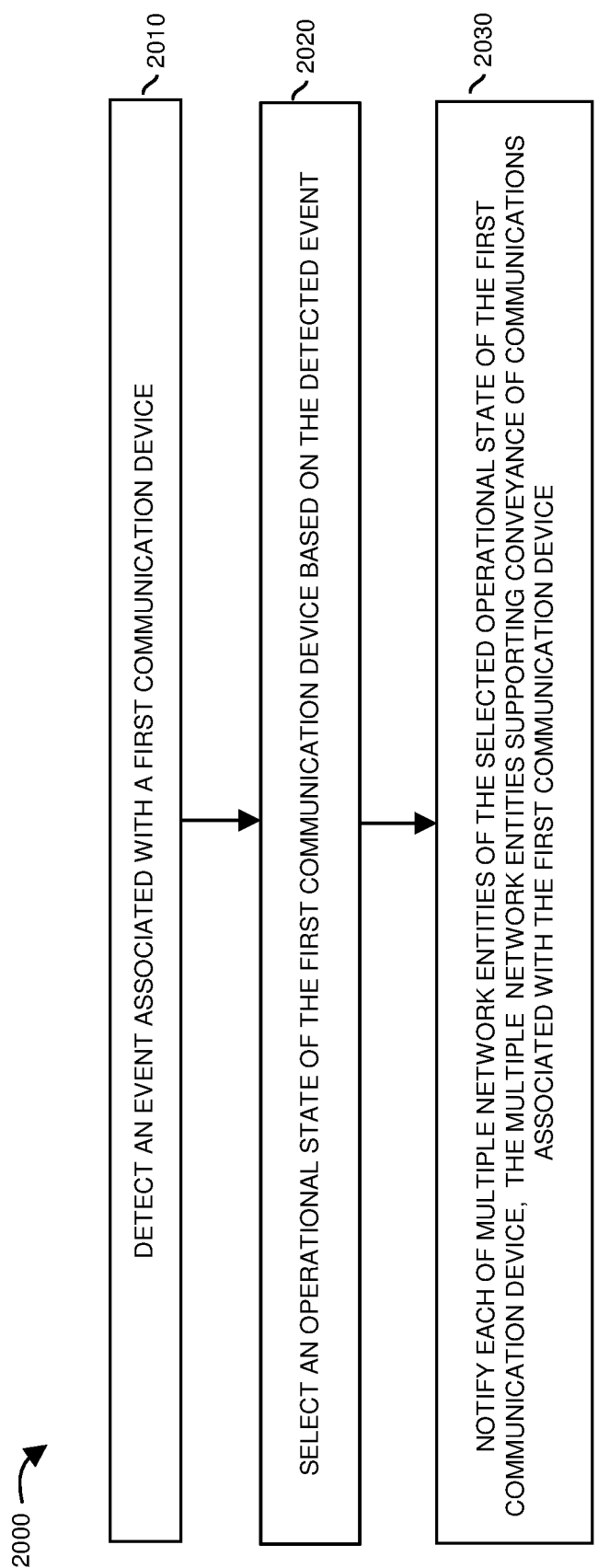

CONTROL OF COMMUNICATION DEVICES IN A WIRELESS NETWORK

BACKGROUND

Conventional RF (Radio Frequency) technology has been used for many years to connect wireless devices such as phones, laptops, etc., to a landline network and other wireless networks. Today, such networks support many different types of connection services such as voice communications, cell communications, high-speed data services, Wi-Fi™ connectivity, and so on.

Cellular networks typically include a land area that has been divided into so-called cellular regions. A single base station typically resides in each cell. Often, the base station is connected to a landline network and supports communication with one or more wireless subscribers operating in a region covered by the cell. Accordingly, a wireless subscriber operating a cell phone in the cell is able to communicate with or have access to a landline network via a wireless link between the subscriber and a base station.

Conventional long-range cellular networks sometimes do not have the ability to provide connectivity to users at every location in a geographical region. One reason for this shortcoming is the high cost associated with designing and subsequently implementing a long-range cell tower for every portion of a geographical region. In many instances, a cell tower providing long-range coverage requires a long-term financial commitment. In certain instances, because costs are so high, a service provider may not even install a cell tower because it is not a good investment.

More recent wireless technology includes so-called pico base stations or Wi-Fi™ stations having the ability to provide short-range coverage compared to long-range coverage provided by conventional cell towers. The short-range base stations have the ability to provide coverage in locations that were not previously possible. As an example, a pico base station may provide radial coverage on the order of 200-300 meters. A long-range base station or conventional cell tower may provide wireless coverage on the order of a mile or more.

Because of cost concerns and higher re-usage of frequencies in the RF spectrum, it is now becoming more common to implement one or more pico base stations to provide additional wireless coverage in a region. Small cell base station deployment may increase the number of cells in a given area, and thereby, improve the overall network capacity without adding more RF spectrums. In certain cases, a short-range base station can be mounted to existing infrastructure (e.g., a cable), alleviating the costs associated with having to design and erect a dedicated tower.

BRIEF DESCRIPTION OF EMBODIMENTS

Embodiments herein provide improved management of wireless access networks and expand use of limited wireless bandwidth in a network environment.

More specifically, a device management resource detects an anomaly event associated with a first communication device based on analysis of first feedback received from multiple network entities supporting conveyance of communications associated with the first communication device. The device management resource selects an operational state of the first communication device based on the detected anomaly event. The device management resource then notifies each of the network entities of the selected operational state of the first communication device. Each of the network entities collects and forwards different feedback data associated with the first communication device depending on the selected operational state of the first communication device.

In further example embodiments, the selected operational state controls a type of second or subsequent feedback collected and communicated from the network entities to a device management resource managing operation of the first communication device. Thus, embodiments herein include network entities that are dynamically configured to provide different feedback to the device management resource depending on the selected state of the first communication device.

The network entities include one or more operative to convey communications associated with the first communication device. For example, in one embodiment, the network entities include one or more of a wireless gateway, a network server, and an application server. In one embodiment, the gateway (such as wireless access point or wireless base station) provides is in communication with the first communication device via a wireless connection. The gateway is communicably coupled to the network server; the network s is communicably coupled to the network server. A combination of the gateway and network server provide the first communication device and other communication devices connectivity to the application server.

In further example embodiments, the notification of the selected operational state or change in operational state of the first communication device causes one or more of the wireless gateway resource, the network server, authentication server, application server, etc., to collect and report a second type of feedback in lieu of the first type of feedback to the device management resource managing operation of the first communication device.

In still further example embodiments, the selected operational state is a troubleshoot mode selected by the device management resource or other suitable entity in response to detecting the anomaly event associated with the first communication device. In one embodiment, during the troubleshoot mode, the device management resource tests operation of the first communication device. In response to detecting an inability to correct a failure associated with the first communication device during the troubleshoot mode, the communication management resource can be configured to deactivate the first communication device. Additionally, or alternatively, in response to detecting an inability to correct a failure associated with the first communication device, the device management resource or other suitable entity notifies each of the network entities of a condition in which the first communication device has been deactivated.

Further embodiments herein include, via the device management resource or other suitable entity, notifying a join server of the selected operational state of the first communication device. Based on the selected operational state, the join server control connectivity of the first communication device to an application server.

In further example embodiments, each of the network entities can be configured to provide different feedback associated with different communication devices depending on the selected operational state of each communication device. For example, in one embodiment, the device management resource detects a second anomaly event associated with a second communication device based on analysis of second feedback from a second set of multiple network entities supporting conveyance of communications associated with the second communication device. The device management resource or other suitable entity selects an operational state of the second communication device based on the detected second anomaly event. The device management resource notifies each of the network entities in the second set of the selected operational state of the second communication device.

In still further example embodiments, based on the selected operational state of the first communication device, the communication management resource (such as device management resource) communicates one or more commands to one or more of the multiple network entities to control collection and conveyance of feedback from those multiple network entities to the communication management resource, which manages testing of the first communication device. In one embodiment, the communicated commands include a corresponding diagnostic test communicated to a first entity or other entities of the multiple network entities for execution. The first entity (such as gateway, network server, join server, authentication server, application server, etc.) executes the diagnostic and communicates it to the communication management resource. The communication management resource (such as feedback management resource, device management resource, etc.) receives diagnostic data from the first entity. The diagnostic data includes collection of data associated with the first communication device. In a similar manner, the communication management resource can be configured to send diagnostics to any of the communication management entities for execution.

In further example embodiments, based on the selected operational state of the first communication device, the communication management resource communicates commands to the multiple network entities. The commands control operation of the multiple network entities with respect to supporting communications associated with the first communication device.

Embodiments herein are useful over conventional techniques. For example, implementation of a configuration management resource and corresponding operations as discussed herein provides improved and expeditious implementation of wireless networks to provide wireless connectivity to different users.

Note that any of the resources as discussed herein can include one or more computerized devices, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by the computer processor hardware, cause the computer processor hardware (such as one or more co-located or disparately processor devices or hardware) to: retrieve network infrastructure map information indicating locations of available physical infrastructure to support installation of wireless access points; analyze image information including at least one image of the available physical infrastructure to determine corresponding supplemental attributes of the available physical infrastructure; and produce a proposed wireless network installation plan for a new wireless network based on the locations and the corresponding supplemental attributes.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing improved wireless connectivity in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 7 is an example diagram illustrating different control functions applied by each of the different communication entities for devices operated in a provisioned mode according to embodiments herein.

FIG. 10 is an example diagram illustrating different control functions applied by each of the different communication entities for devices operated in an active mode according to embodiments herein.

FIG. 13 is an example diagram illustrating different control functions applied by each of the different communication entities for devices operated in a troubleshoot mode according to embodiments herein.

FIG. 16 is an example diagram illustrating different control functions applied by each of the different communication entities for devices operated in a quarantined mode according to embodiments herein.

FIG. 20 is an example diagram illustrating a method according to embodiments herein.

Figure 1:
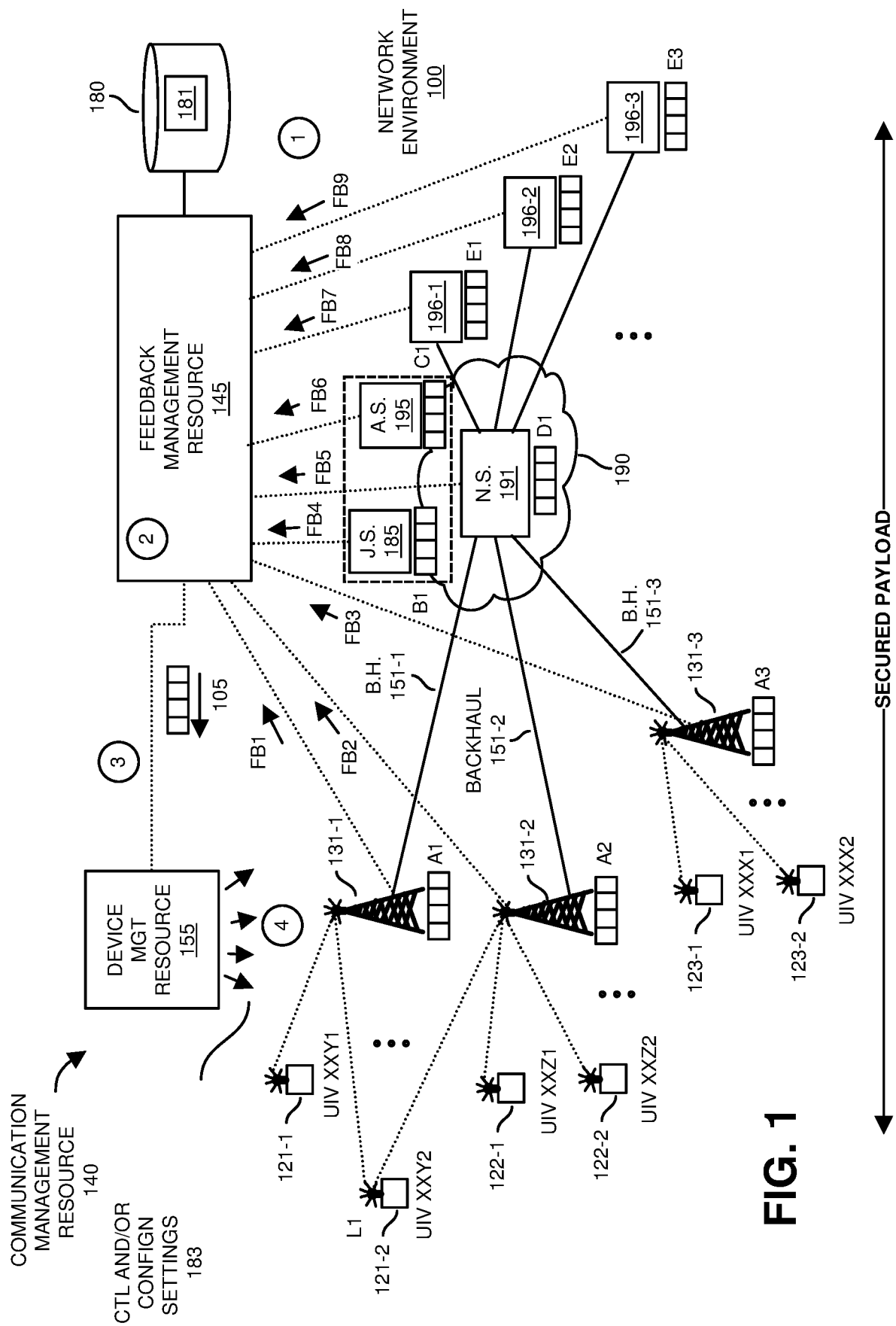
FIG. 1 is an example diagram illustrating implementation of a configuration management system and related components according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

This disclosure proposes a method and framework for device management and streamline network operations from device management perspective. In one embodiment, the framework shall facilitate establishing and managing lists of (i) provisioned-but-not-active (ii) active-operational (iii) trouble-shooting (iv) quarantined devices. These lists are managed in concert and kept in sync by a DevMgr (or other suitable entity) across each of the multiple different types communication management entities such as gateway GW, network server NS, and backend servers such as authentication server, join server JS, application servers AS, etc.

Further embodiments herein include providing a framework to: i) synchronize the lists across all communication management functions such as LORA (Long Range) network or other network functions at each of the communication management entities, ii) provide notification of control and/or actions to be performed by each of the network functions with respect to each device type category, iii) provide notification of additional information (meta data) to be gathered and transported to the device management resource by each network function for a device in a given category, iv) process collected data (such as meta data) via one or more analytic functions to identify issues and devices of interest.

In one implementation, each of the network functions at different locations in a network environment collects meta data and sends it to an analytics engine. The analytics engine processes the collected data to identify any new devices to be monitored closely or quarantined. In one nonlimiting example embodiment, semantics in this solution framework are described with respect to LoRaWAN devices, however the framework is applicable to IoT networks and devices involving other access technologies Embodiments herein provide efficient management of each of multiple devices, especially when it is possible to communicate with the devices but the devices have abnormal behavior. This enables the communication management resource to quickly identify and mitigate problematic devices, before the devices become completely unmanageable. The solution as discussed herein can be specification compliant from the device perspective as well as leverage existing messages to achieve this functionality. As further discussed herein, novel functionality is be incorporated in one or more of the gateways GW, network server NS, join server JS, application server AS, and authentication server, as well as in a respective application executed on the device. Embodiments herein allows a device manager to quarantine an erratic device and while, while the device is still connected to the network, terminate further operation of the device if it cannot be fixed.

Thus, one embodiment herein includes a device management resource that detects an anomaly event associated with a first communication device based on analysis of first feedback from multiple network entities supporting conveyance of communications associated with the first communication device. The device management resource selects an operational state of the first communication device based on the detected anomaly event. The device management resource then notifies each of the network entities of the selected operational state of the first communication device. Each of the network entities collects and forwards different feedback data associated with the first communication device depending on the selected operational state of the first communication device.

FIG. 1 is an example diagram illustrating implementation of a configuration management system and related components according to embodiments herein.

As shown, the network environment 100 includes communication management resource 140 as well as one or more communication device 121-1, communication device 121-2, ..., communication device 122-1, communication device 122-2, ..., communication device 123-1, communication device 123-2, etc.

Communication management resource 140 includes one or more of the following components: gateway 131-1, gateway 131-2, gateway 131-3, join server 185, authentication server 195, network server 191, application server 196-1 (a.k.a., AS), application server 196-2, application server 196-3, feedback management resource 145, repository 180, and device management resource 155.

In one embodiment, note that the network environment 100 and corresponding communication management entities are implemented in accordance with LoRa™.

Note that the join server 185 and the authentication server 195 and corresponding functionality can be implemented via a single computer. In such an instance, the JS (Join Server) provides join aspects as well as acts an authenticator for the devices, so from this perspective, the join server and authentication server may be one and the same. Alternatively, each of the different functions associated with the join server 185 and the functions associated with the authentication server 195 can be implemented by disparately located computers.

Note that each of the resources as discussed herein can be implemented in any suitable manner. For example, the communication management resource 140 can be implemented as communication management hardware, communication management software, or a combination of communication management hardware and communication management software; a respective gateway can be implemented as gateway hardware, gateway software, or combination of gateway hardware and gateway software; join server 185 can be implemented as join server hardware, join server software, or a combination of joint server hardware and joint server software; authentication server 195 can be implemented via authentication server hardware, authentication server software, or combination of authentication server hardware and authentication server software; network server 191 can be implemented via network server hardware, network server software, or combination of network server hardware and network server software; a respective application server 196 can be implemented as application server hardware, application server software, or combination of application server hardware and application server software; feedback management resource 145 can be implemented as feedback management hardware, feedback management software, or a combination of feedback management hardware and feedback management software; the device management resource 155 can be implemented as device management hardware, device management software, or combination of device management hardware and device management software; each of the communication devices can be implemented as communication device hardware, communication device software, or combination of communication device hardware and communication device software; and so on.

As further shown, each of the communication devices in the network environment 100 is assigned a respective unique identifier value so that the communication management entities (such as gateways, joint service, authentication servers, network servers, application servers, feedback management resource, device management resource, etc.) in the network environment 100 can track collected data as well as an identity of a corresponding communication device to which it pertains.

More specifically, communication device 121-1 is assigned unique identifier value XXY1 (such as one or more of a unique network address or addresses, globally unique identifier value, etc.) communication device 121-2 is assigned unique identifier value XXY2, communication device 122-1 is assigned unique identifier value XXZ1, communication device 122-2 is assigned unique identifier value XXZ2, communication device 123-1 is assigned unique identifier value XXX1, communication device 123-2 is assigned unique identifier value XXX2, etc.

Each of the communication devices in network environment 100 is configured to execute one or more functions. For example, a respective communication device can be configured to monitor a parameter such as temperature, pressure, weather conditions, vending machine data, etc., and communicate such information to a corresponding application server in the network environment 100.

Assume in this example embodiment that the communication device 121-2 collects data associated with monitoring a temperature or other parameter at location L1 where the communication device 121-2 resides. Assume further that the server resource 196-1 manages data generated by the communication device 121-2.

In accordance with scheduled operations, assume that the communication device 121-2 generates a join request to communicate over wireless link to the gateway 131-1. The gateway 131-1 forwards the respective join request over backhaul 151-1 to the join server 185. The joint server 185 processes the request and forwards it to the authentication server 195. If the communication device 121-2 provides the appropriate credentials to access the network, the authentication server 195 communicates acceptance of the join request to the joint server 185. The join server 185 further communicates a join except message over backhaul 151-1 through the gateway 131-1 to the communication device 121-2. The communication device 121-2 is then provided a communication path through the gateway 131-1 and the network server 191 to the application server 196-1.

Subsequent to authentication, the communication device 121-2 communicates respective messages through the gateway 131-1, and the network server 191 to the application server 196-1, The application server 196-1 processes and stores the received data each time the communication device 121-2 provides updated information associated with temperature or other one or more monitored parameters.

In a similar manner, the communication device 121-2 can be configured to communicate through the gateway 131-2 and over backhaul 151-2 to the joint server 185. Subsequent to authentication, the communication device 121-2 can be configured to communicate collected data through the gateway 131-2 over backhaul 151-2 and through the network server 191 to the application server 196-1.

As further shown, each of the communication management entities (such as gateways, joint server, authentication servers, network servers, application service, etc.) monitors attributes of communications associated with each of the communication devices depending upon respective control commands and/or configuration setting information 183. As previously discussed, the device management resource 155 can be configured to generate one or more specific commands that are communicated to one or more of the entities in the network environment 100 to control what type of feedback are provided by the respective entity. Additionally, or alternatively, the device management resource 155 notifies the respective entity to perform a specific test (such as associated with the respective entity or communications associated with a respective communication device 121 being tested) and then provide corresponding feedback associated with the executed test.

In further example embodiments, the control commands and/or configuration setting information 183 provide notification of a particular operational state of each communication device and corresponding policy to be implemented with respect to generating feedback. For example, the wireless gateway 131-1 is assigned feedback/control configuration settings A1; the wireless gateway 131-2 is assigned feedback/control configuration settings A2; the wireless gateway 131-3 is assigned feedback/control configuration settings A3; the join server 185 is assigned feedback/control configuration settings B1; the authentication server 195 is assigned feedback/control configuration settings C1; the network server 191 is assigned feedback/control configuration settings D1; the application server 196-1 is assigned feedback/control configuration settings E1; the application server 196-2 is assigned feedback/control configuration settings E2; the application server 196-3 is assigned feedback/control configuration settings E3; and so on.

As further discussed herein, each of the feedback/control configuration settings indicate what type of functions to apply to communications associated with a respective communication device as well as what types of parameters to monitor associated with the communications and produce corresponding feedback that is forwarded to the feedback management resource 145.

Each of the communication devices can be operated in one of multiple mode such as a provisioned mode P, active mode A, troubleshoot mode T, quarantined mode Q, etc.

In one embodiment, the device management resource 155 notifies each of the respective communication management entities (such as gateways, join server, authentication server, network server, application servers, etc.) in the network environment 100 of a respective mode (P, A, T, Q) in which the respective communication device 121-2 is currently operated.

Figure 2:
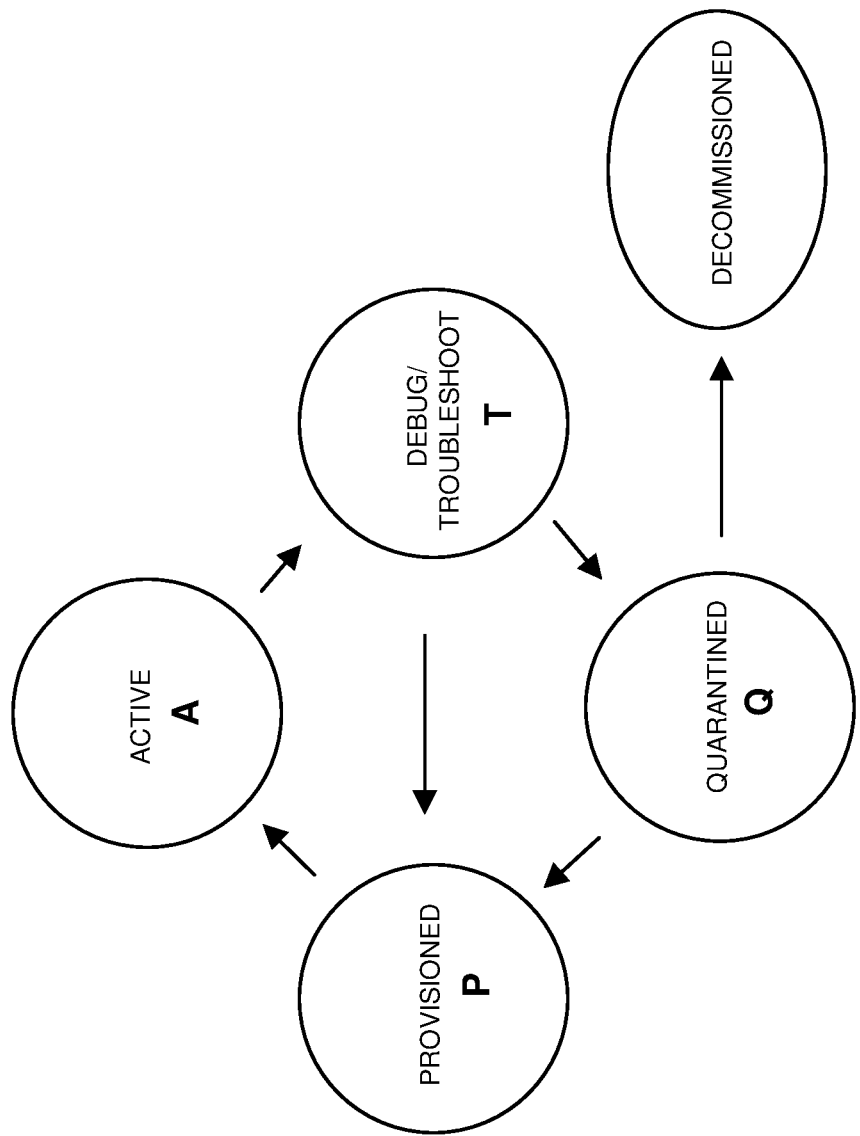
FIG. 2 is an example flow diagram illustrating different states of operating a respective end device according to embodiments herein.

FIG. 2 is an example flow diagram illustrating different states of operating a respective end device according to embodiments herein.

As shown in FIG. 2, each of the communication devices present in the network environment 100 can be operated in a provisioned mode P, an active mode A, a troubleshoot mode T, a quarantined mode Q, and a decommissioned mode (use of device terminated).

More specifically, the device management resource 155 controls transitioning of a respective communication device from the provisioned mode P to the active mode A. The device management resource 155 controls transitioning of the respective communication device from the active mode A to the debug-troubleshoot mode T. The device management resource 155 controls transitioning of the respective communication device from the debug-troubleshoot mode T to either the provisioned mode P or the quarantined mode Q. The device management resource 155 further controls transitioning of the respective communication device from the quarantined mode Q to either the provisioned mode P or the decommissioned mode.

Figure 3:
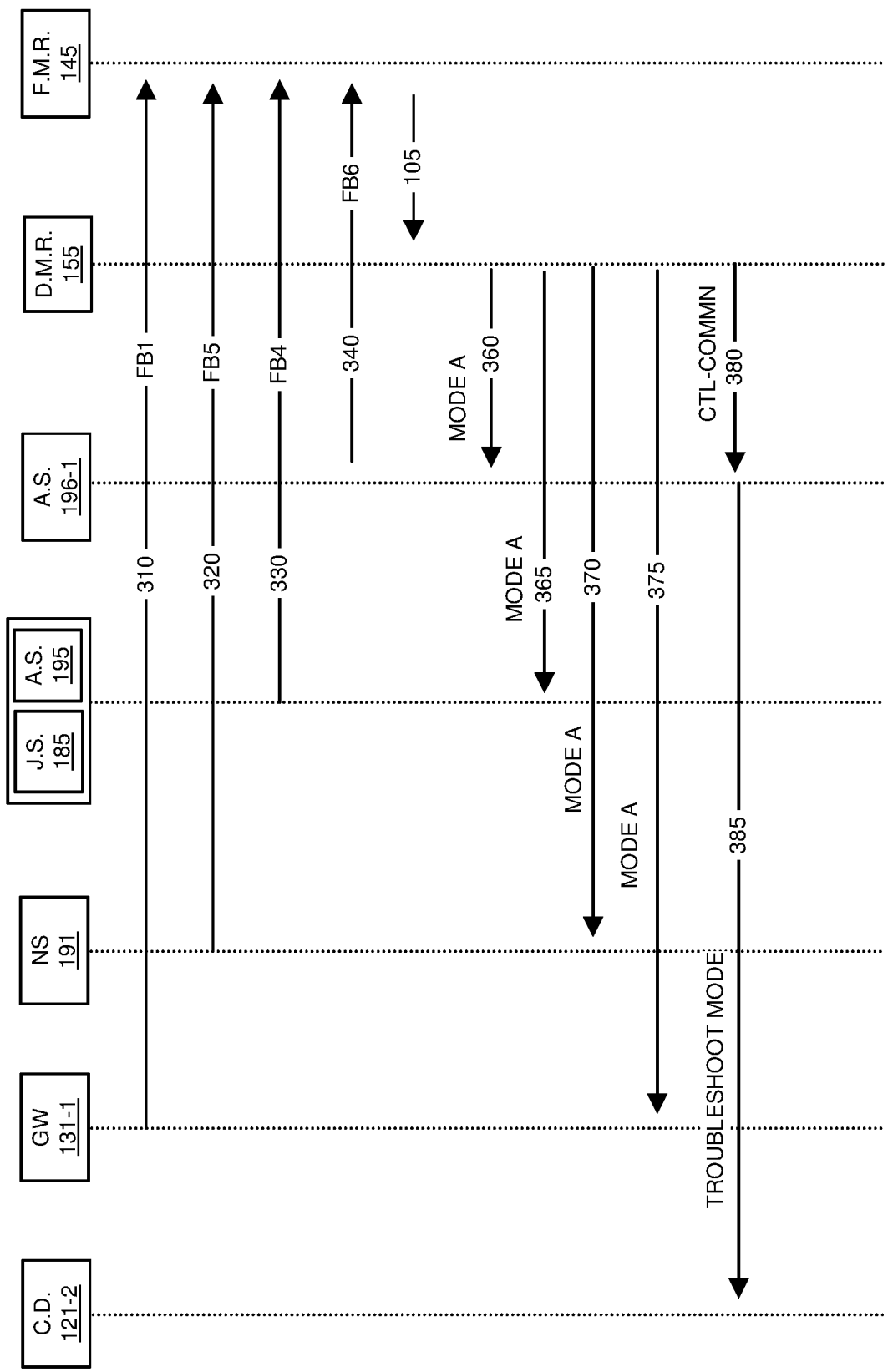
FIG. 3 is an example diagram illustrating data flows associated with management of devices according to embodiments herein.

FIG. 3 is an example diagram illustrating data flows associated with management of devices according to embodiments herein.

In one embodiment, a provisioned and non-active device (in the P mode) does not generate any user plane traffic, this shall be enforced via the authentication server and network server. Any deviation from this behavior will be detected and reported via feedback to the device management resource 155 and also to the feedback management resource 145. Any state change of the communication device to transition to the active mode A per operator policy is also updated in the corresponding list.

A device in a given category and expected behavior and the corresponding functions monitor flow of traffic, the feedback management resource 145 ensures adherence and compliance of the devices and flags any deviations to the device management resource 155 for an appropriate such as changing a device mode and notifying the communication management entities of same.

A device in the active mode A list is active and operational. Note that different types of device in this category may be further refined with amount and frequency of data each device is expected to transmit through the respective communication management entities. Any deviation detected from expected behavior is flagged by a respective gateway GW, network server NS, application server AS, etc. Any device which in violation of an expected normal operation for the category/sub-category (mode of the device) is moved to debug/troubleshoot mode T and corresponding feedback configuration settings list. For devices in compliance, respective statistics associated with the devices are gathered for regular report generation.

For the devices in the debug/troubleshoot mode T, per the device profile and/or capabilities, the device management resource 155 initiates a connection with the devices through a respective application server AS at an application level to generate application level diagnostics and initiate appropriate action such as software update/configuration reset/restart of the device. If the device becomes operational again, it will be moved to the active mode A. Alternatively, if the communication device does not become operational, the device management resource 155 moves the device to the quarantined mode Q. Any change in the mode status of the respective communication device is communicated to each of the communication management entities indicating a respective new operational mode of the device. As discussed herein, the communication management entities then monitor appropriate parameters associated with the new operational mode.

Any devices that are deemed in a harmful state with respect to network operations or a given application are moved to a quarantined mode Q. For all devices which are placed in the quarantine mode, the join server denies authentication and thus wireless network access. The application server AS and network server NS will discard any data received from these devices. For any devices in the quarantine mode Q, a respective gateway will not forward any traffic originating from these devices.

In one embodiment, the device management resource 155 can be configured to terminate further operation of the respective communication device so that it no longer can communicate with any of the communication management entities in the network environment 100.

As shown in the flow diagram 300 of FIG. 3, the gateway 131-1 monitors communications associated with the communication device 121-2 and through the gateway 131-1. Based on the respective operational mode of the communication device 121-2 as indicated by the device management resource 155, via communications 310 from the gateway 131-1 to the feedback management resource 145, the gateway 131-1 provides corresponding feedback FB1 (such as collected information associated with a set of monitored parameters for a given current selected mode of the communication device 121-2) to the feedback management resource 145.

The network server 191 monitors communications associated with the communication device 121-2 and through the network server 191. Based on the respective operational mode of the communication device 121-2 as indicated by the device management resource 155, via communications 320 from the network server 191 to the feedback management resource 145, the network server 191 provides corresponding feedback FB5 (such as collected information associated with a set of monitored parameters for a given current selected mode of the communication device 121-2) to the feedback management resource 145.

The join server 185 monitors communications associated with the communication device 121-2 and through the join server 185. Based on the respective current operational mode of the communication device 121-2 as indicated by the device management resource 155, via communications 330 from the join server 185 to the feedback management resource 145, the join server 185 provides corresponding feedback FB4 (such as collected information associated with a set of monitored parameters for a given current selected mode of the communication device 121-2) to the feedback management resource 145.

The application server 196-1 monitors communications associated with the communication device 121-2 and received by the application server 196-1. Based on the respective current operational mode of the communication device 121-2 as indicated by the device management resource 155, via communications 340 from the join server 185 to the feedback management resource 145, the application server 196-1 provides corresponding feedback FB6 (such as collected information associated with a set of monitored parameters for a given current selected mode of the communication device 121-2) to the feedback management resource 145.

As previously discussed, based on the respective feedback from of the multiple communication management entities in the network environment 100, the feedback management resource 145 selects an appropriate operational mode of the communication device 121-2 communicates the selected mode in control signal 105 to the device management resource.

As further shown, the device management resource 155 communicates notification of the mode change associated with communication device 121-2 to each of the one or more communication management entities in the network environment 100 supporting communications associated with the communication device 121-2. For example, via communications 360, the device management resource 155 provides notification to the application server 196-1 of a newly selected operational mode of the communication device 121-2. This change in mode causes the application server 196-1 to monitor different parameters associated with communications from the communication device 121-2 and report corresponding feedback associated with the monitoring of the communication device 121-2 (i.e., based on parameters associated with the newly selected operational mode for the application server 196-1) to the feedback management resource 145.

Via communications 365, the device management resource 155 provides notification to the join server 185 of the newly selected operational mode of the communication device 121-2. This change in mode causes the join server 185 to monitor different parameters associated with communications from the communication device 121-2 and report corresponding feedback associated with the monitoring of the communication device 121-2 (i.e., based on parameters associated with the newly selected operational mode for the joint server 185) to the feedback management resource 145.

Via communications 370, the device management resource 155 provides notification to the network server 191 of the newly selected operational mode of the communication device 121-2. This change in mode causes the network server 191 to monitor different parameters associated with communications from the communication device 121-2 and report corresponding feedback associated with the monitoring of the communication device 121-2 (i.e., based on parameters associated with the newly selected operational mode for the network server 191) to the feedback management resource 145.

Via communications 375, the device management resource 155 provides notification to the gateway 131-1 of the newly selected operational mode of the communication device 121-2. This change in mode causes the gateway 131-1 to monitor different parameters associated with communications from the communication device 121-2 and report corresponding feedback associated with the monitoring of the communication device 121-2 (i.e., based on parameters associated with the newly selected operational mode for the gateway 131-1) to the feedback management resource 145.

As previously discussed, in one embodiment, the device management resource 155 notifies the communication device 121-2 and corresponding communication management entities that the communication device 121-2 is operated in the troubleshoot mode T. The device management resource 155 can be configured to perform diagnostics with respect to the communication device 121-2 during the troubleshoot mode. For example, in one embodiment, via communications 380 and communications 385, the device management resource 155 communicates with and through the application server 196-1 to the communication device 121-2 in order to test the communication device 121-2. This can include communicating a command from the device management resource 155 to the communication device 121-2. The communication device 121-2 executes the command and provides corresponding response information such as data through the network to the device management resource 155. Based on the response information from the communication device 121-2, and/or the corresponding feedback received from the one or more communication management entities associated with communications between the communication device 121-2 and the device management resource 155 during the troubleshoot mode T, the device management resource 155 determines a respective health such as whether or not the communication device 121-2 experiences a respective failure or the origin of a failure. If the device management resource 155 is able to fix the failure, the communication device 121-2 can be set to the active mode A again. Alternatively, if the device management resource 155 is not able to fix the failure, the communication device is set to a quarantined mode Q.

Thus, embodiments herein include the device management resource 155 communicating with the communication device 121-2 through accommodation of the application server 196-1, network server 191, and gateway 131-1. As previously discussed, each of the communication management entities such as application server 196-1, network server 191, gateway 131-1 monitor parameters associated with operation of the communication device 121-2 and the troubleshooting mode T. The feedback generated by each of these communication management entities provides troubleshooting information to determine whether or not the communication device 121-2 is operating properly.

Figure 4:
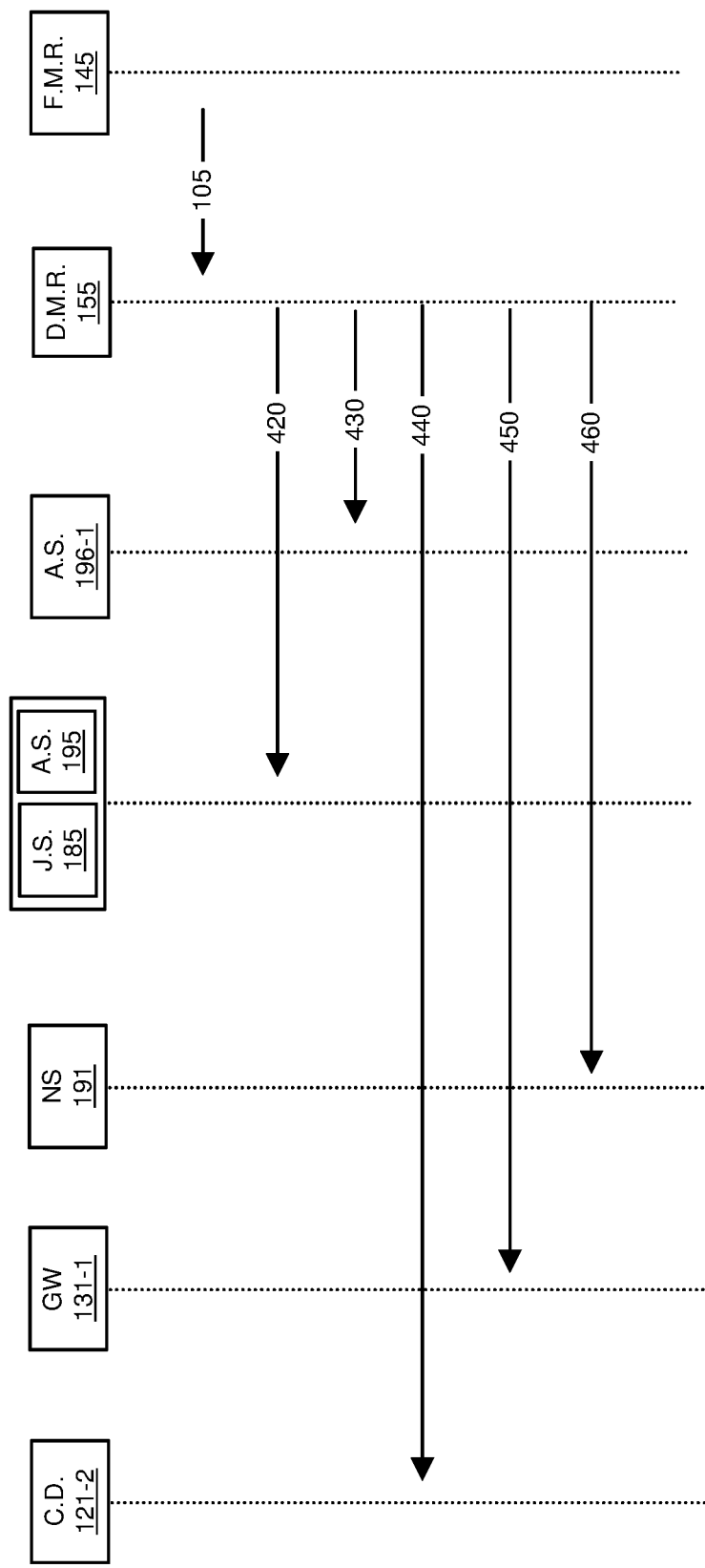
FIG. 4 is an example diagram illustrating data flows associated with management of devices according to embodiments herein.

FIG. 4 is an example diagram illustrating data flows associated with management of devices according to embodiments herein.

In this example embodiment, via control signal 105, the feedback management resource 145 or other suitable entity notifies the device management resource 155 that the communication device 121-2 is terminated from the network. In such an instance, via communications 420, the device management resource 155 notifies the join server 185 and authentication server that the communication device 121-2 is no longer allowed to communicate with any of the communication management entities in the network environment 100.

As further shown, via communications 430, the device management resource 155 notifies the application server 196-1 of the termination and decommissioning of the communication device 121-2. Via communications 440, the device management resource 155 notifies the communication device 121-2 that it has been terminated and decommissioned. Via communications 450, the device management resource 135 notifies the gateway 131-1 that the communication device 121-2 has been terminated and decommissioned. Via communications 460, the device management resource 135 notifies the network server 191 that the communication device 121-2 has been terminated and decommissioned.

Figure 5:
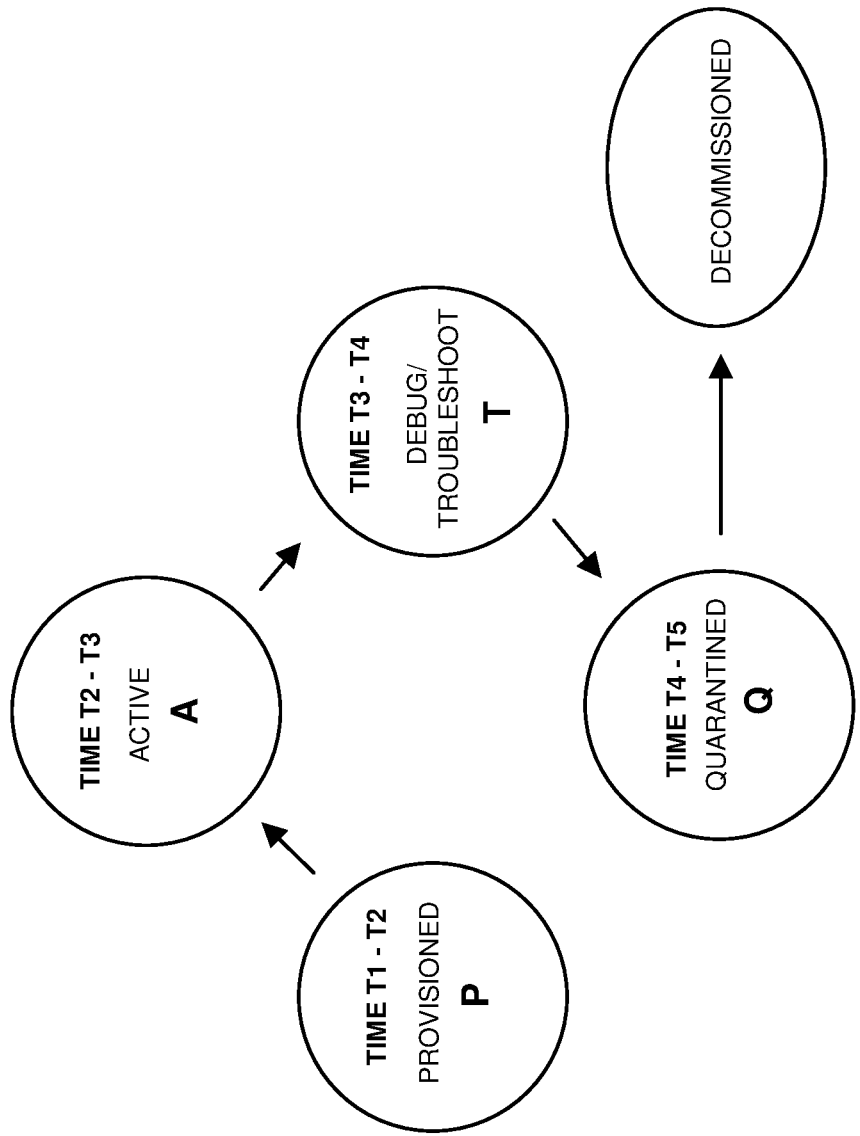
FIG. 5 is an example diagram illustrating an example life cycle of a respective device according to embodiments herein.

FIG. 5 is an example diagram illustrating an example life cycle of a respective device according to embodiments herein.

In this example embodiment, the communication management resource 140 as discussed herein provisions a respective communication device 121-2 at state P such as between time T1 and time T2.

Subsequent to respective provisioning of the respective communication device, the device management resource 155 transitions operation of the respective communication device to the active state A such as between time T2 and time T3. In such an instance, the device management resource 155 notifies the respective communication management entities at or around time T2 that the respective device is now operated in the active state A. In the active state A, as previously discussed, the respective communication device collects and communicates data through a respective one or more gateways and network server to a respective one or more applications servers that manage collection of the corresponding data.

The communication management entities (such as gateways, join server, authentication server, network server, application server etc.) monitor operation and/or communications associated with the respective communication device operating in the active mode A. The communication management entities generate feedback based on the monitored operations/communications and forward the feedback to feedback management resource 145. In response to detecting an anomaly condition associated with the communication device 121-2 based on the received feedback, the feedback management resource 145 transitions operation of the respective communication device to the debug-troubleshoot mode T between time T3 and time T4. The device management resource 155 notifies each of the communication management entities of the change in status associated with the respective communication device to mode T at or around time T3, resulting in the communication management entities monitoring and feeding back different information associated with the communication device 121-2 and corresponding communications to the feedback management resource 145.

The communication management entities (such as gateways, join server, authentication server, network server, application server etc.) monitor operation and/or communications associated with the respective communication device 121-2 operating in the troubleshoot mode T. The communication management entities generate feedback based on the monitored operations/communications and forward the feedback to feedback management resource 145 for the troubleshoot mode T. In response to detecting further operating conditions of the respective communication device based on the received feedback, the device management resource 155 transitions operation of the respective communication device 121-2 to the quarantine mode Q. The device management resource 155 notifies each of the communication management entities of the change in status associated with the respective communication device to mode Q, resulting in the communication management entities monitoring and feeding back different information associated with a respective communication device and corresponding communications to the feedback management resource 145.

The device management resource 155 may determine that the respective communication device 121-2 cannot be fixed. In such an instance, the device management resource 155 can be configured to decommission or terminate further use of the communication device in the network environment 100. The device management resource 155 notifies each of the communication management entities that the use of the respective communication device 121-2 has been terminated and that there is no longer need to monitor operations/communications associated with the respective communication device.

Figure 6:
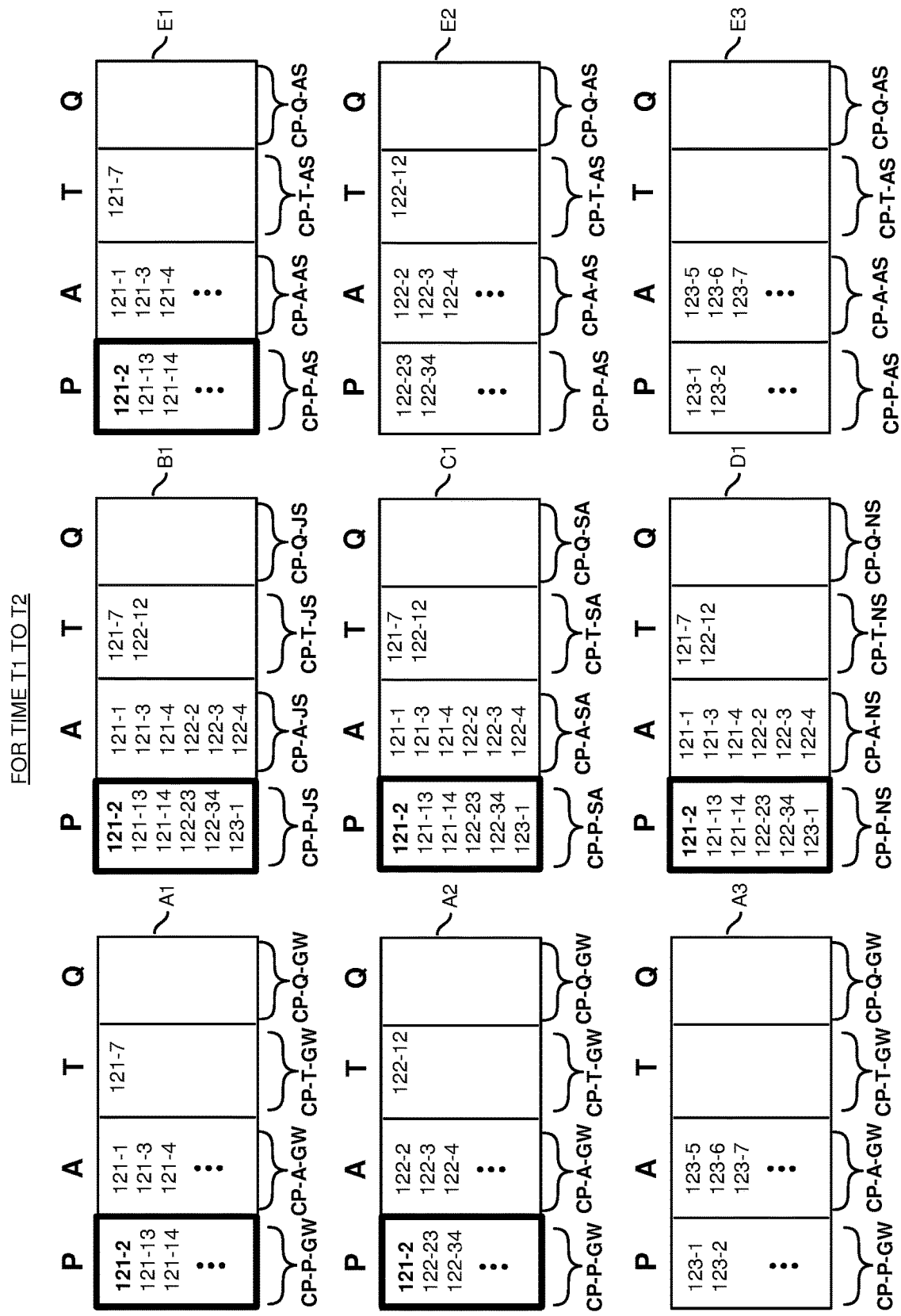
FIG. 6 is an example diagram illustrating application of a respective control/collection function associated with a device at different communication entities according to embodiments herein.

FIG. 6 is an example diagram illustrating application of a respective control/collection function associated with a device at different communication entities according to embodiments herein.

In this example embodiment, assume that the device management resource 155 assigns the communication device 121-2 to the provisioned mode P at or around time T1. In such an instance, the device management resource 155 or other suitable entity updates (at or around time T1) each of the feedback/control configuration settings associated with the communication management entities in network environment 100 supporting communications associated with the communication device 121-2.

More specifically, as shown in FIG. 6, the device management resource 155 updates the feedback/control configuration settings A1 (list of communication devices in the P mode supported by the gateway 131-1) to indicate that the communication device 121-2 has been set to the provisioned mode P. In such an instance, because the identity of the communication device 121-2 is included in the P list of information A1, the corresponding gateway 131-1 applies the policy CP-P-GW to any communications passing through the gateway 131-1 and that originate from or are potentially transmitted to the communication device 121-2. The gateway 131-1 is configured to detect communications from the communication device 121-2 based upon a respective unique identifier value XXY2 as a source address included in the communications; if desired, the gateway 131-1 detects communications to the communication device 121-2 based upon a respective unique identifier value XXY2 as a destination address included in the communications to the communication device 121-2. Additionally, as previously discussed, when collecting information associated with the communication device 121-2 and corresponding communications, in accordance with the policy CP-P-GW assigned to the gateway 131-1, the gateway 131-1 produces the respective feedback FB1-1 (see FIG. 8) based on monitoring (parameters P1 in FIG. 7 as specified by the policy CP-P-GW) of the communications from/to the communication device 121-2 and forwards corresponding generated feedback FB1-1 (based on monitored parameters P1) to the feedback management resource 145.

The device management resource 155 also updates the feedback/control configuration settings A2 to indicate that the communication device 121-2 has been set to the provisioned mode P. In such an instance, because the identity of the communication device 121-2 is included in the P list of information A2, the corresponding gateway 131-2 applies the policy CP-P-GW to any communications passing through the gateway 131-2 and that originate from or are transmitted to the communication device 121-2. As previously discussed, the gateway 131-2 detects communications from the communication device 121-2 based upon a respective unique identifier value XXY2 as a source address included in the communications; if desired, the gateway 131-2 detects communications to the communication device 121-2 based upon a respective unique identifier value XXY2 as a destination address included in the communications to the communication device 121-2. Additionally, as previously discussed, when collecting information associated with the communication device 121-2 and corresponding communications, in accordance with the policy CP-P-GW, the gateway 131-2 produces the respective feedback FB2-1 (see FIG. 8) based on monitoring (parameters P1 in FIG. 7 as specified by the policy CP-P-GW) of the communications from/to the communication device 121-2 and forwards FB2-1 to the feedback management resource 145.

The device management resource 155 also updates the feedback/control configuration settings B1 to indicate that the communication device 121-2 has been set to the provisioned mode P. In such an instance, because the identity of the communication device 121-2 is included in the P list of information B1, the corresponding join server 185 applies the policy CP-P-JS to any communications passing through the join server 185 and that originate from or are transmitted to the communication device 121-2. As previously discussed, the join server 185 detects communications from the communication device 121-2 based upon a respective unique identifier value XXY2 as a source address included in the communications; if desired, the join server 185 can be configured to detect communications to the communication device 121-2 based upon a respective unique identifier value XXY2 as a destination address included in the communications to the communication device 121-2. Additionally, when collecting information associated with the communication device 121-2 and corresponding communications, as previously discussed, in accordance with the policy CP-P-JS, the join server 185 produces the respective feedback FB4-1 (see FIG. 8) based on monitoring (parameters P4 in FIG. 7 as specified by the policy CP-P-JS) of the communications from/to the communication device 121-2 and forwards FB4-1 to the feedback management resource 145.

The device management resource 155 also updates the feedback/control configuration settings C1 to indicate that the communication device 121-2 has been set to the provisioned mode P. In such an instance, because the identity of the communication device 121-2 is included in the P list of information C1, the corresponding authentication server 195 applies the policy CP-P-SA to any communications passing to or through the authentication server 195 and that originate from or are transmitted to the communication device 121-2. As previously discussed, the authentication server 195 detects communications from the communication device 121-2 based upon a respective unique identifier value XXY2 as a source address included in the communications; if desired, the authentication server 195 detects communications to the communication device 121-2 based upon a respective unique identifier value XXY2 as a destination address included in the communications to the communication device 121-2. Additionally, as previously discussed, when collecting information associated with the communication device 121-2 and corresponding communications, in accordance with the policy CP-P-SA, the authentication server 195 produces the respective feedback FB6-1 (see FIG. 8) based on monitoring (parameters P6 in FIG. 7 as specified by the policy CP-P-SA) of the communications from/to the communication device 121-2 and forwards FB6-1 to the feedback management resource 145.

The device management resource 155 also updates the feedback/control configuration settings D1 to indicate that the communication device 121-2 has been set to the provisioned mode P. In such an instance, because the identity of the communication device 121-2 is included in the P list of information D1, the corresponding network server 191 applies the policy CP-P-NS to any communications passing to or through the network server 191 and that originate from or are transmitted to the communication device 121-2. As previously discussed, when collecting information associated with the communication device 121-2 and corresponding communications, the network server 191 detects communications from the communication device 121-2 based upon a respective unique identifier value XXY2 as a source address included in the communications; if desired, the network server 191 detects communications to the communication device 121-2 based upon a respective unique identifier value XXY2 as a destination address included in the communications to the communication device 121-2. Additionally, as previously discussed, when collecting information associated with the communication device 121-2 and corresponding communications, in accordance with the policy CP-P-NS, the network server 191 produces the respective feedback FB5-1 (see FIG. 8) based monitoring (parameters P5 in FIG. 7 as specified by the policy CP-P-NS) of on the communications from/to the communication device 121-2 and forwards FB5-1 to the feedback management resource 145.

The device management resource 155 also updates the feedback/control configuration settings E1 to indicate that the communication device 121-2 has been set to the provisioned mode P. In such an instance, because the identity of the communication device 121-2 is included in the P list of information E1, the corresponding application server 196-1 applies the policy CP-P-AS to any communications passing to or through the application server 196-1 and that originate from or are transmitted to the communication device 121-2. As previously discussed, the application server 196-1 detects communications from the communication device 121-2 based upon a respective unique identifier value XXY2 as a source address included in the communications; if desired, the application server 196-1 detects communications to the communication device 121-2 based upon a respective unique identifier value XXY2 as a destination address included in the communications to the communication device 121-2. Additionally, as previously discussed, when collecting information associated with the communication device 121-2 and corresponding communications, in accordance with the policy CP-P-AS, the application server 196-1 produces the respective feedback FB7-1 (see FIG. 8) based on monitoring (parameters P7 in FIG. 7 as specified by the policy CP-P-AS) of the communications from/to the communication device 121-2 and forwards FB7-1 to the feedback management resource 145.

FIG. 7 is an example diagram illustrating different control functions applied by each of the different communication entities for devices operated in a provisioned mode according to embodiments herein.

As previously discussed, the corresponding communication management entities collect data and produce feedback based on parameters associated with the selected operational mode of the communication device 121-2.

For example, the configuration settings 183-P and corresponding policy CP-P-GW indicate that the gateway 131-1 is to produce feedback FB1-1 based on monitored parameters P1 of communications associated with the communication device 121-2 when the communication device 121-2 is set to the provisioned mode P. In addition to indicating parameters to monitor for generating feedback FB1-1, the policy CP-P-GW can be configured to indicate different control functions to be applied by the gateway 131-1 to communications associated with the corresponding communication device 121-2.

The configuration settings 183-P and corresponding policy CP-P-JS indicate that the join server 185 is to produce feedback FB4-1 based on monitored parameters P4 of communications associated with the communication device 121-2 when the communication device 121-2 is set to the provisioned mode P. In addition to indicating parameters to monitor for generating feedback FB4-1, the policy CP-P-JS can be configured to indicate different control functions to be applied by the join server 185 to communications associated with the corresponding communication device 121-2.

The configuration settings 183-P and corresponding policy CP-P-NS indicate that the network server 191 is to produce feedback FB5-1 based on monitored parameters P5 of communications associated with the communication device 121-2 when the communication device 121-2 is set to the provisioned mode P. In addition to indicating parameters to monitor for generating feedback FB5-1, the policy CP-P-NS can be configured to indicate different control functions to be applied by the network server 191 to communications associated with the corresponding communication device 121-2.

The configuration settings 183-P and corresponding policy CP-P-SA indicate that the authentication server 195 is to produce feedback FB6-1 based on monitored parameters P6 of communications associated with the communication device 121-2 when the communication device 121-2 is set to the provisioned mode P. In addition to indicating parameters to monitor for generating feedback FB6-1, the policy CP-P-SA can be configured to indicate different control functions to be applied by the authentication server 195 to communications associated with the corresponding communication device 121-2.

The configuration settings 183-P and corresponding policy CP-P-AS indicate that the application server 196-1 is to produce feedback FB7-1 based on monitored parameters P7 of communications associated with the communication device 121-2 when the communication device 121-2 is set to the provisioned mode P. In addition to indicating parameters to monitor for generating feedback FB7-1, the policy CP-P-AS can be configured to indicate different control functions to be applied by the application server 196-1 to communications associated with the corresponding communication device 121-2.

Figure 8:
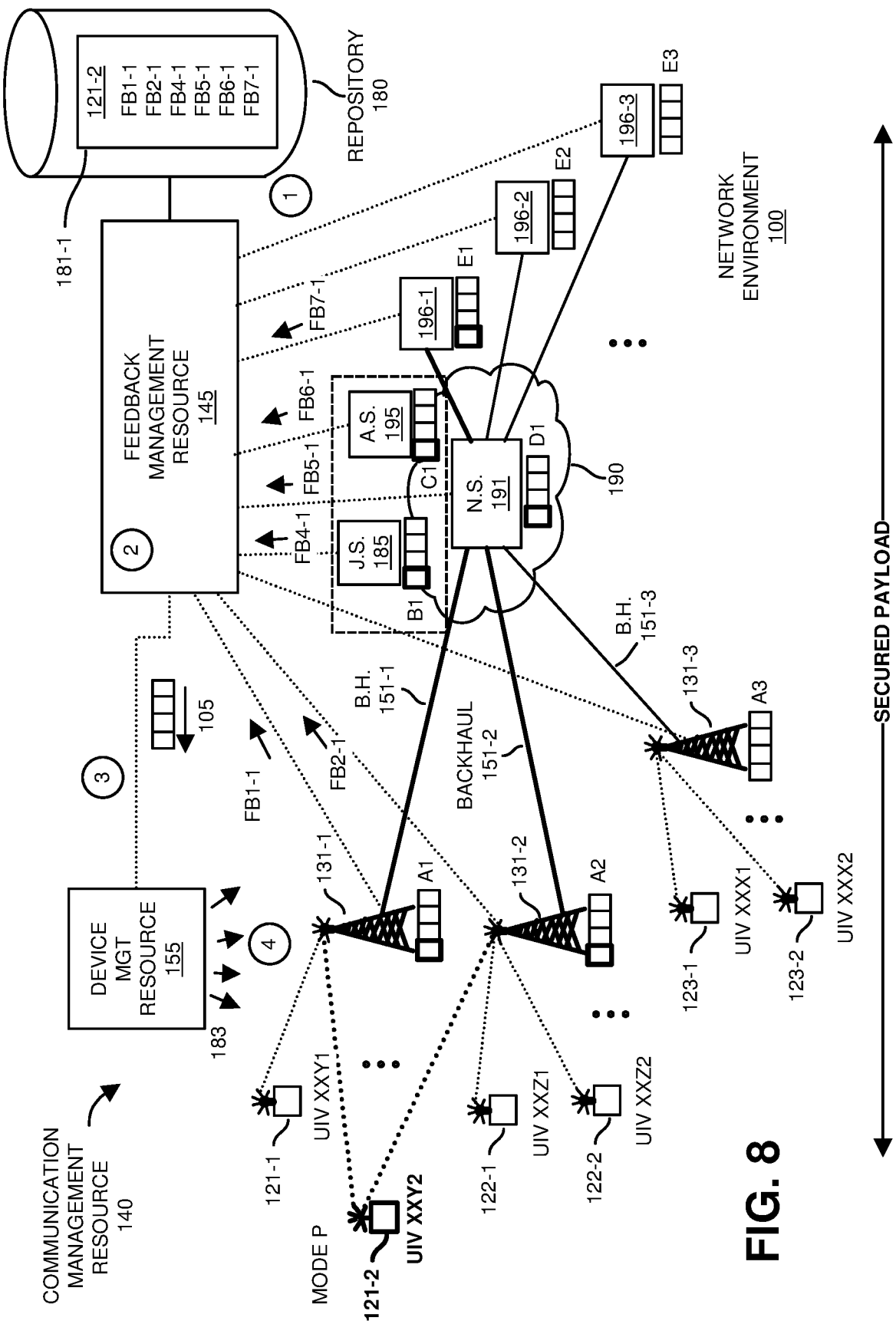
FIG. 8 is an example diagram illustrating collection of data associated with a respective communication device and forwarding of corresponding collected feedback information from each of multiple entities to a feedback management resource according to embodiments herein.

FIG. 8 is an example diagram illustrating collection of data associated with a respective communication device and forwarding of corresponding collected feedback information from each of multiple entities to a feedback management resource according to embodiments herein.

As shown, the communication device 121-2 transmits communications over a first communication path between the communication device 121-2 and the application server 196-1 (such as over a respective wireless communication link from the communication device 121-2 to the gateway 131-1 such as a wireless access point or wireless base station, over the backhaul 151-1 through the network server 191 to the application server 196-1). The communication device 121-2 transmits communications over a second communication path between the communication device 121-2 and the application server 196-1 (such as over a respective wireless communication link from the communication device 121-2 to the gateway 131-2 such as a wireless access point or wireless base station, over the backhaul 151-2, through the network server 191 to the application server 196-1).

In a manner as previously discussed, while in the P mode, each of the communication management entities in network environment 100 monitors communications associated with the communication device 121-2 and generates respective feedback communicated to the feedback management resource 145. For example, based on implementation of policy CP-P-GW associated with feedback/control configuration settings A1, the gateway 131-1 generates feedback FB1-1 based on monitored parameters P1 and communicates the feedback FB1-1 to the feedback management resource 145. Based on implementation of policy CP-P-GW associated with feedback/control configuration settings A2, the gateway 131-2 generates feedback FB2-1 based on monitored parameters P1 and communicates the feedback FB2-1 to the feedback management resource 145. Based on implementation of policy CP-P-JS associated with feedback/control configuration settings B1, the join server 185 generates feedback FB4-1 based on monitored parameters P4 and communicates the feedback FB4-1 to the feedback management resource 145. Based on implementation of policy CP-P-NS associated with feedback/control configuration settings D1, the network server 191 generates feedback FB5-1 based on monitored parameters P5 and communicates the feedback FB5-1 to the feedback management resource 145. Based on implementation of policy CP-P-SA associated with feedback/control configuration settings C1, the authentication server 195 generates feedback FB6-1 based on monitored parameters P6 and communicates the feedback FB6-1 to the feedback management resource 145.

Based on implementation of policy CP-P-AS associated with feedback/control configuration settings E1, the application server 196-1 generates feedback FB7-1 based on monitored parameters P7 and communicates the feedback FB7-1 to the feedback management resource 145.

In a manner as previously discussed, the feedback management resource 145 monitors a status of the communication device 121-2 based on the received feedback. Based on the feedback, and/or detection of a particular condition other than based on the feedback, the feedback management resource 145 can be configured to switch the communication device 121-2 to the active mode A. In such an instance, the device management resource 155 moves an identity of the communication device 121-2 to the active mode list at each node as shown in the following FIGS.

This includes updating the feedback/control configuration settings information of each of the communication management entities depending on the selected operational mode of the communication device 121-2. For example, assume that the feedback management resource 145 or other suitable entity selects operation of the communication device 121-2 in the active mode A. In such an instance, the device management resource 155 updates identity of the communication device 121-2 to be included in the active A list (for each of feedback/control configuration settings A1, A2, B1, C1, D1, and E1. In such an instance, as further discussed herein, each of the communication management entities in the network environment 100 provide different feedback associated with communications of the communication device 121-2 to the feedback management resource 145 depending on a respective collection/control policy assigned to the entity for the selected mode A.

Figure 9:
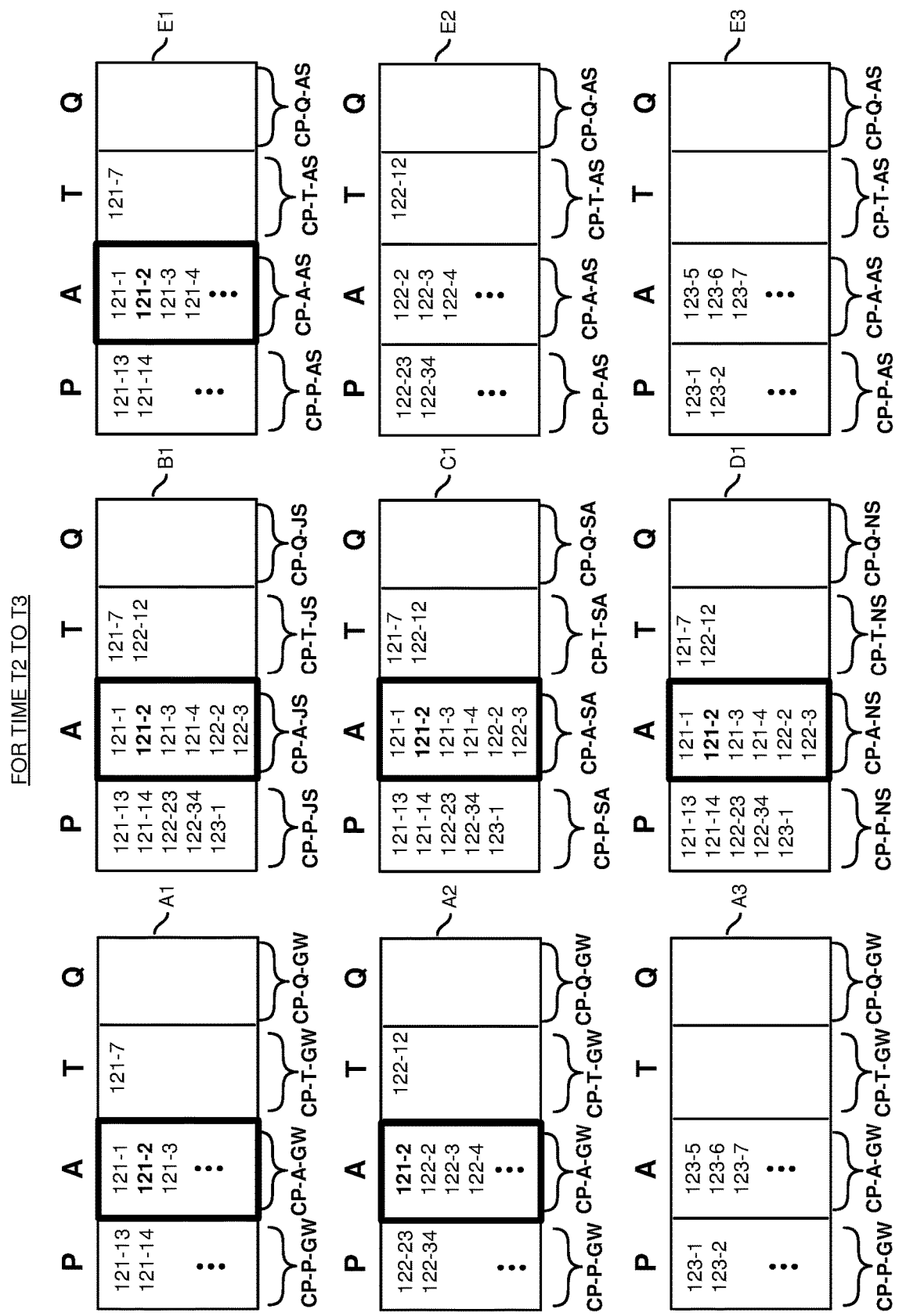
FIG. 9 is an example diagram illustrating application of a respective control/collection function associated with a device at different communication entities according to embodiments herein.

FIG. 9 is an example diagram illustrating application of a respective control/collection function associated with a device at different communication entities according to embodiments herein.

As shown in this example, at or around time T2, the device management resource 155 moves an identity of the communication device 121-2 to the active mode A for each of the different instances of feedback/control configuration settings A1, A2, B1, C1, D1, E1, and F1.

In such an instance, the gateway 131-1 generates feedback FB1-2 based on monitoring parameters ACT1 (see FIG. 10) as specified by policy CP-A-GW assigned to the gateway 131-1 for communications from (active mode A) communication devices 121-1, 121-2, 121-3, etc., passing through gateway 131-1.

The gateway 131-2 generates feedback FB2-2 based on monitoring parameters ACT1 (see FIG. 10) as specified by policy CP-A-GW assigned to the gateway 131-2 for communications from (active mode A) communication devices 121-2, 122-2, 122-3, etc., passing through gateway 131-1.

The join server 185 generates feedback F94-2 based on monitoring parameters ACT4 (see FIG. 10) as specified by policy CP-A-JS assigned to the join server 185 for communications from (active mode A) communication devices 121-1, 121-2, 121-3, 121-4, 122-2, 122-3, etc., passing through or to the join server 185.

The network server 191 generates feedback FB5-2 based on monitoring parameters ACT5 (see FIG. 10) as specified by policy CP-A-NS assigned to the network server 191 for communications from (active mode A) communication devices 121-1, 121-2, 121-3, 121-4, 122-2, 122-3, etc., passing through or to the network server 191.

The authentication server 195 generates feedback FB6-2 based on monitoring parameters ACT6 (see FIG. 10) as specified by policy CP-A-SA assigned to the authentication server 195 for communications from (active mode A) communication devices 121-1, 121-2, 121-3, 121-4, 122-2, 122-3, etc., passing through or to the network server 191.

The application server 196-1 generates feedback FB7-2 based on monitoring parameters ACT7 (see FIG. 10) as specified by policy CP-A-AS assigned to the application server 196-1 for communications from (active mode A) communication devices 121-1, 121-2, 121-3, 121-4, 122-2, 122-3, etc., passing through or to the application server 196-1.

FIG. 10 is an example diagram illustrating different control functions applied by each of the different communication entities for devices operated in an active mode according to embodiments herein.

In a similar manner as previously discussed, configuration settings 183-A indicate the different parameters to be monitored by the corresponding entities in the network environment for generating corresponding feedback to the feedback management resource 145.

Figure 11:
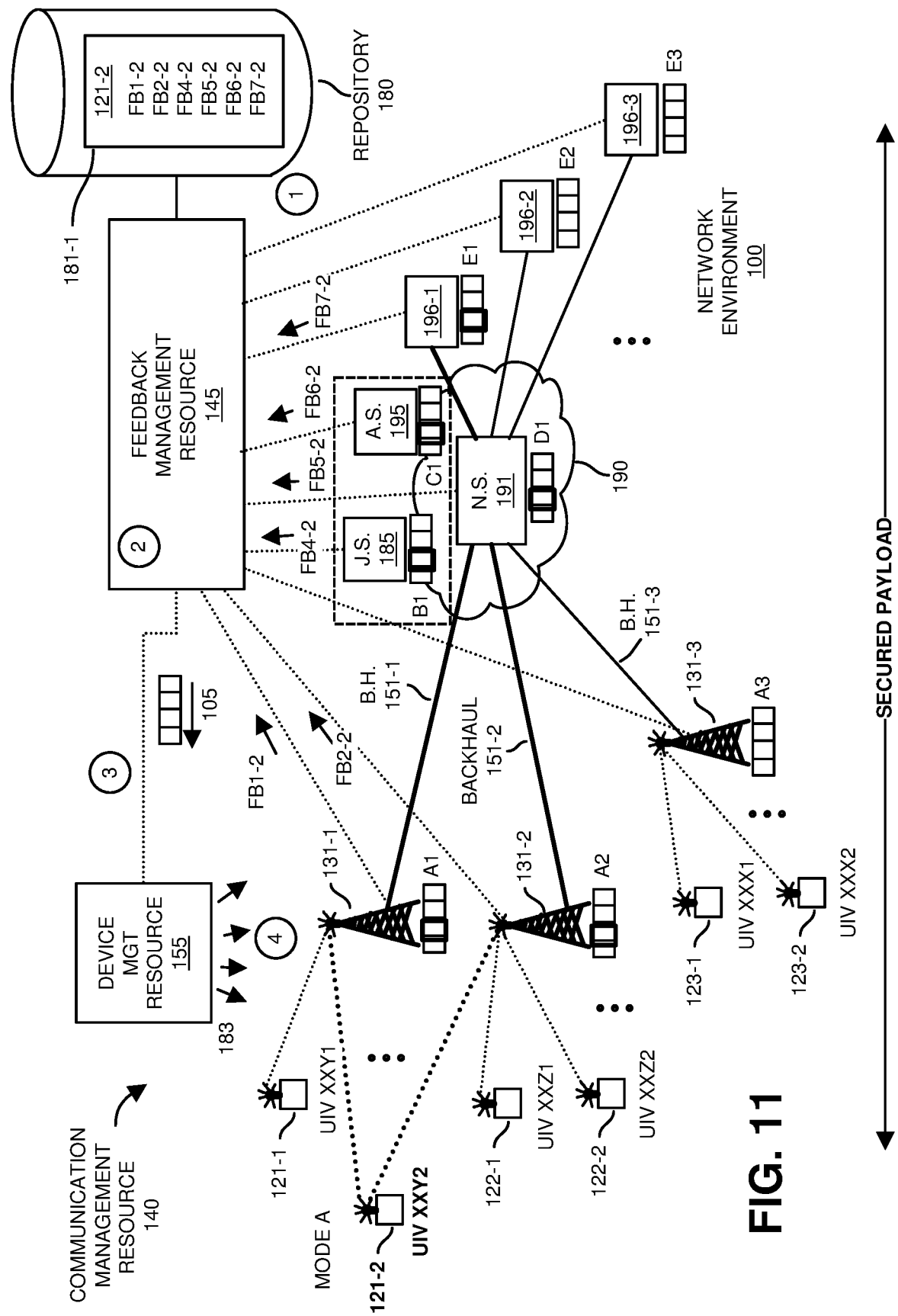
FIG. 11 is an example diagram illustrating collection of data associated with a respective communication device and forwarding of corresponding collected feedback information from each of multiple entities to a feedback management resource according to embodiments herein.

FIG. 11 is an example diagram illustrating collection of data associated with a respective communication device and forwarding of corresponding collected feedback information from each of multiple entities to a feedback management resource according to embodiments herein.

While the communication device 121-2 is set to the A mode, each of the communication management entities in network environment 100 monitors communications associated with the communication device 121-2 and generates respective feedback communicated to the feedback management resource 145.

For example, based on implementation of policy CP-A-GW associated with feedback/control configuration settings A1, the gateway 131-1 generates feedback FB1-2 based on monitored parameters ACT1 associated with communications from the communication device 121-2 and communicates the feedback FB1-2 to the feedback management resource 145.

Based on implementation of policy CP-A-GW associated with feedback/control configuration settings A2, the gateway 131-2 generates feedback FB2-2 based on monitored parameters ACT1 associated with communications from the communication device 121-2 and communicates the feedback FB2-2 to the feedback management resource 145.

Based on implementation of policy CP-A-JS associated with feedback/control configuration settings B1, the join server 185 generates feedback F94-2 based on monitored parameters ACT4 associated with communications from the communication device 121-2 and communicates the feedback FB4-2 to the feedback management resource 145.

Based on implementation of policy CP-A-NS associated with feedback/control configuration settings D1, the network server 191 generates feedback FB5-2 based on monitored parameters ACT5 associated with communications from the communication device 121-2 and communicates the feedback FB5-2 to the feedback management resource 145.

Based on implementation of policy CP-A-SA associated with feedback/control configuration settings C1, the authentication server 195 generates feedback FB6-2 based on monitored parameters ACT6 associated with communications from the communication device 121-2 and communicates the feedback FB6-2 to the feedback management resource 145.

Based on implementation of policy CP-A-AS associated with feedback/control configuration settings E1, the application server 196-1 generates feedback FB7-2 based on monitored parameters ACT7 associated with communications from the communication device 121-2 and communicates the feedback FB7-2 to the feedback management resource 145.

Figure 12:
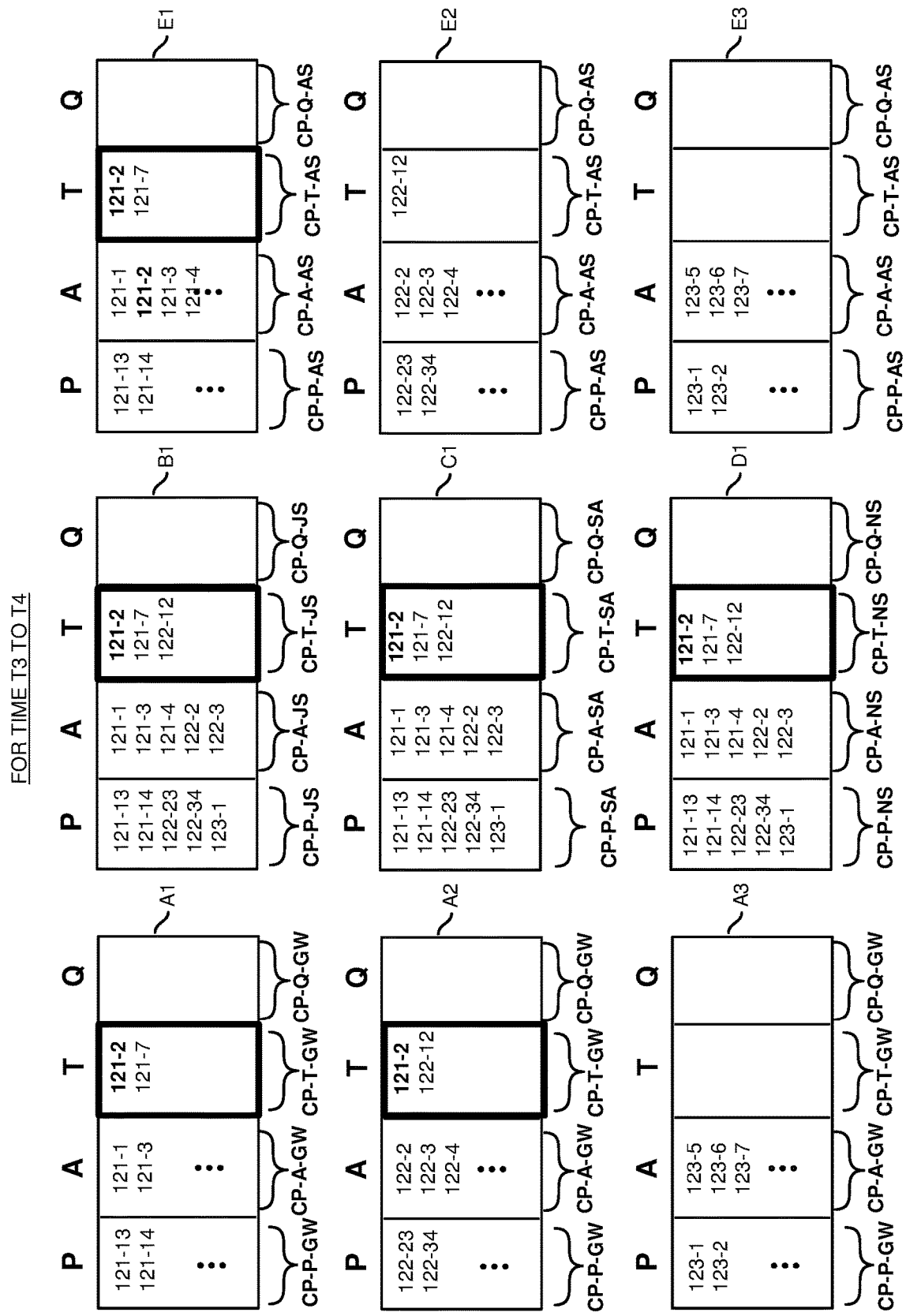
FIG. 12 is an example diagram illustrating application of a respective control/collection function associated with a device at different communication entities according to embodiments herein.

FIG. 12 is an example diagram illustrating application of a respective control/collection function associated with a device at different communication entities according to embodiments herein.

As shown in this example, at or around time T3, the device management resource 155 moves an identity of the communication device 121-2 to the troubleshoot mode T for each of the different instances of feedback/control configuration settings A1, A2, B1, C1, D1, E1, and F1.

In such an instance, the gateway 131-1 generates feedback FB1-3 based on monitoring parameters T1 (see FIG. 13) as specified by policy CP-T-GW assigned to the gateway 131-1 for communications from (troubleshoot mode T) communication devices 121-2, 121-7, passing through gateway 131-1.

The gateway 131-2 generates feedback FB2-3 based on monitoring parameters T1 (see FIG. 13) as specified by policy CP-T-GW assigned to the gateway 131-2 for communications from (troubleshoot mode T) communication devices 121-2, 122-7, passing through gateway 131-1.

The join server 185 generates feedback FB4-3 based on monitoring parameters T4 (see FIG. 13) as specified by policy CP-T-JS assigned to the join server 185 for communications from (troubleshoot mode T) communication devices 121-2, 121-7, 122-12, passing through or to the join server 185.

The network server 191 generates feedback FB5-3 based on monitoring parameters T5 (see FIG. 13) as specified by policy CP-T-NS assigned to the network server 191 for communications from (troubleshoot mode T) communication devices 121-2, 121-7, 122-12, passing through or to the network server 191.

The application server 196-1 generates feedback FB7-3 based on monitoring parameters T7 (see FIG. 13) as specified by policy CP-T-AS assigned to the application server 196-1 for communications from (troubleshoot mode T) communication devices 121-2, 121-7, passing through or to the application server 196-1.

FIG. 13 is an example diagram illustrating different control functions applied by each of the different communication entities for devices operated in a troubleshoot mode according to embodiments herein.

In a similar manner as previously discussed, configuration settings 183-T indicate the different parameters to be monitored by the corresponding entities in the network environment for generating corresponding feedback to the feedback management resource 145.

Figure 14:
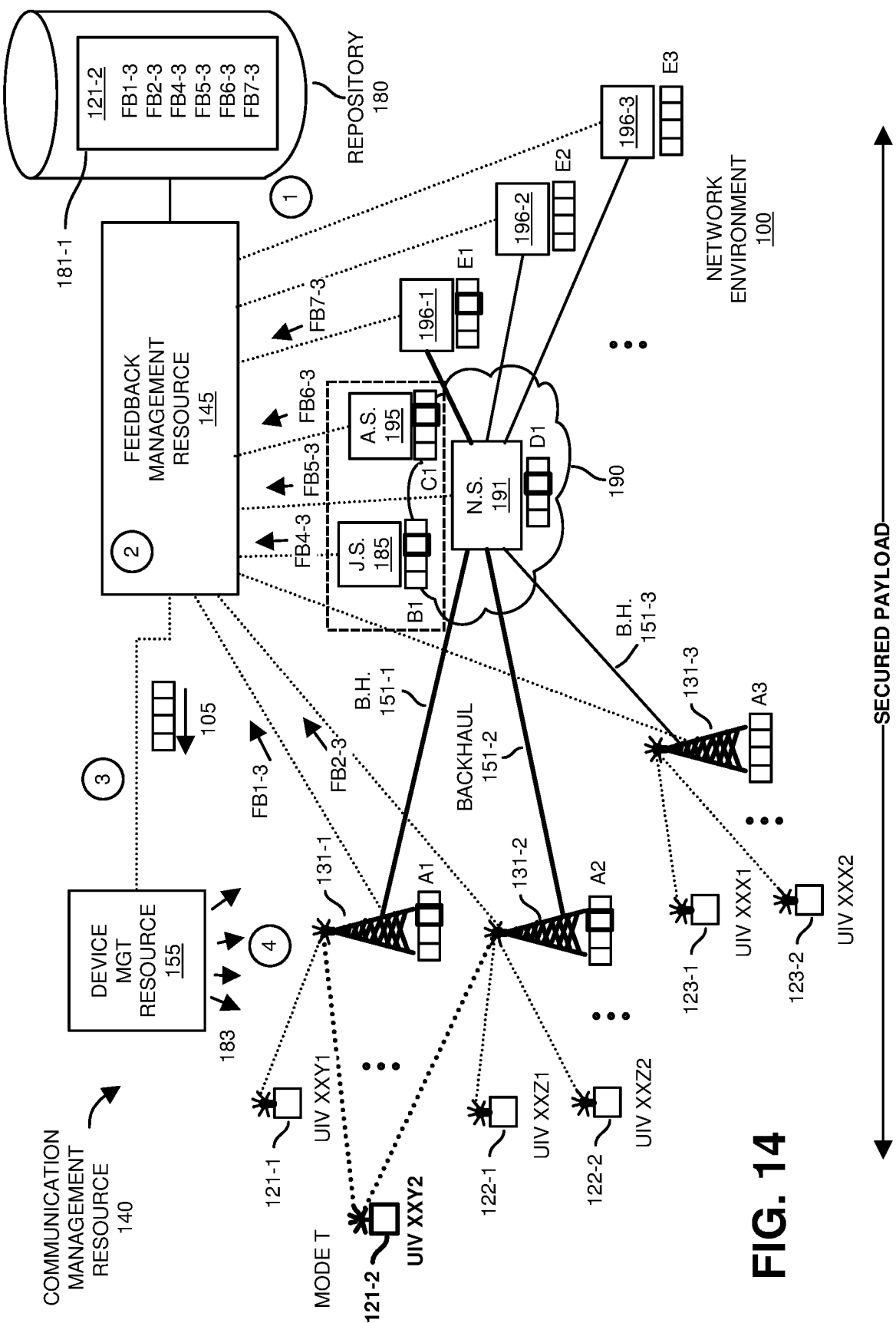
FIG. 14 is an example diagram illustrating collection of data associated with a respective communication device and forwarding of corresponding collected feedback information from each of multiple entities to a feedback management resource according to embodiments herein.

FIG. 14 is an example diagram illustrating collection of data associated with a respective communication device and forwarding of corresponding collected feedback information from each of multiple entities to a feedback management resource according to embodiments herein.

While the communication device 121-2 is set to the T mode, each of the communication management entities in network environment 100 monitors communications associated with the communication device 121-2 and generates respective feedback communicated to the feedback management resource 145.

For example, based on implementation of policy CP-T-GW associated with feedback/control configuration settings A1, the gateway 131-1 generates feedback FB1-3 based on monitored parameters T1 associated with communications from the communication device 121-2 and communicates the feedback FB1-3 to the feedback management resource 145.

Based on implementation of policy CP-T-GW associated with feedback/control configuration settings A2, the gateway 131-2 generates feedback FB2-3 based on monitored parameters T1 associated with communications from the communication device 121-2 and communicates the feedback FB2-3 to the feedback management resource 145.

Based on implementation of policy CP-T-JS associated with feedback/control configuration settings B1, the join server 185 generates feedback F94-3 based on monitored parameters T4 associated with communications from the communication device 121-2 and communicates the feedback FB4-3 to the feedback management resource 145.

Based on implementation of policy CP-T-NS associated with feedback/control configuration settings D1, the network server 191 generates feedback FB5-3 based on monitored parameters T5 associated with communications from the communication device 121-2 and communicates the feedback FB5-3 to the feedback management resource 145.

Based on implementation of policy CP-T-SA associated with feedback/control configuration settings C1, the authentication server 195 generates feedback FB6-3 based on monitored parameters T6 associated with communications from the communication device 121-2 and communicates the feedback F96-3 to the feedback management resource 145.

Based on implementation of policy CP-T-AS associated with feedback/control configuration settings E1, the application server 196-1 generates feedback FB7-3 based on monitored parameters T7 associated with communications from the communication device 121-2 and communicates the feedback FB7-3 to the feedback management resource 145.

Figure 15:
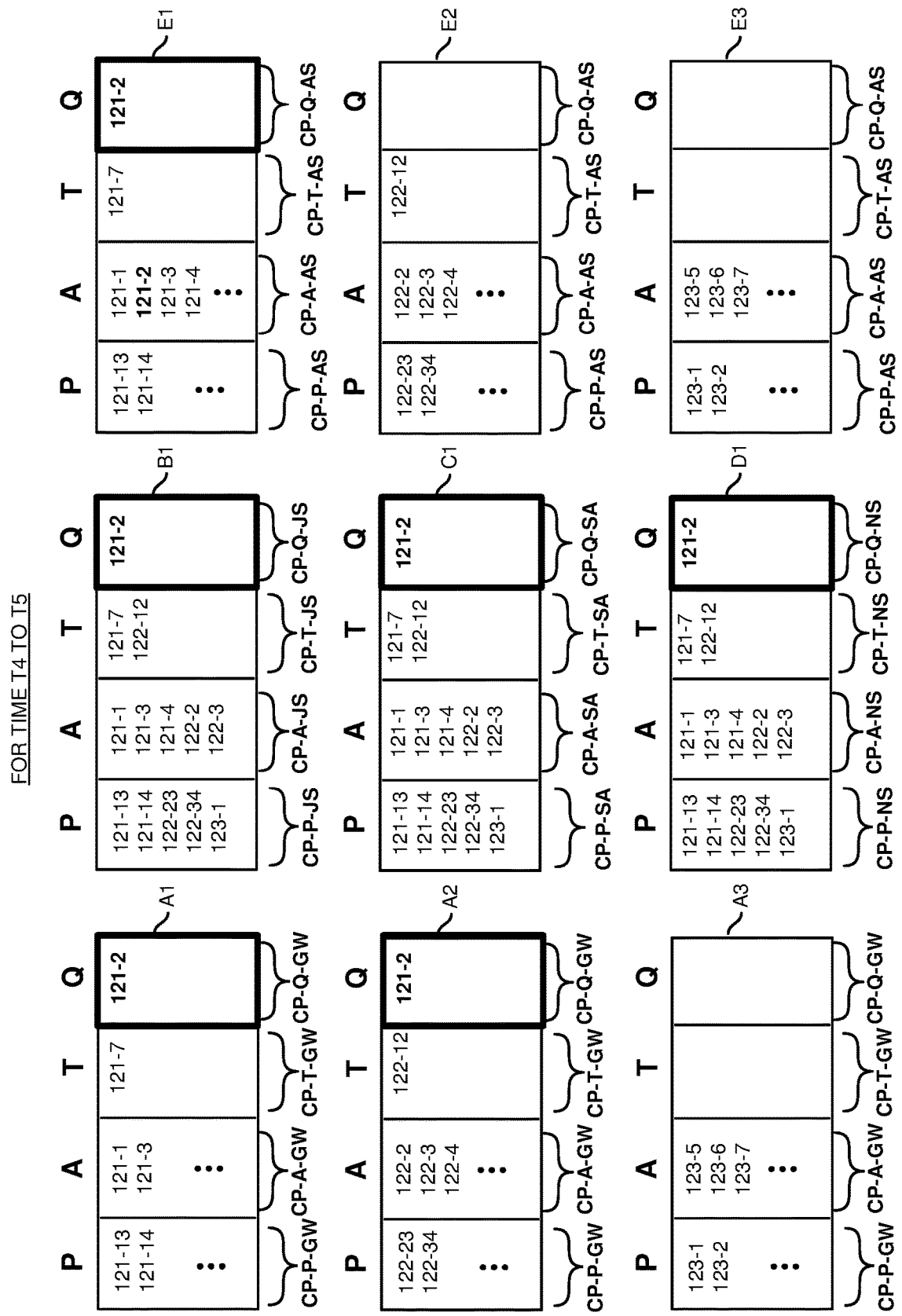
FIG. 15 is an example diagram illustrating application of a respective control/collection function associated with a device at different communication entities according to embodiments herein.

FIG. 15 is an example diagram illustrating application of a respective control/collection function associated with a device at different communication entities according to embodiments herein.

As shown in this example, at or around time T4, the device management resource 155 moves an identity of the communication device 121-2 to the quarantine mode Q for each of the different instances of feedback/control configuration settings A1, B1, C1, D1, E1, and F1.

In such an instance, the gateway 131-1 generates feedback FB1-4 based on monitoring parameters Q1 (see FIG. 16) as specified by policy CP-Q-GW assigned to the gateway 131-1 for communications from (quarantine mode Q) communication device 121-2 passing through gateway 131-1.

The gateway 131-2 generates feedback FB2-4 based on monitoring parameters Q1 (see FIG. 16) as specified by policy CP-Q-GW assigned to the gateway 131-2 for communications from (mode Q) communication device 121-2 passing through gateway 131-1.

The join server 185 generates feedback FB4-4 based on monitoring parameters Q4 (see FIG. 16) as specified by policy CP-Q-JS assigned to the join server 185 for communications from (mode Q) communication device 121-2 passing through or to the join server 185.

The network server 191 generates feedback FB5-4 based on monitoring parameters Q5 (see FIG. 16) as specified by policy CP-Q-NS assigned to the network server 191 for communications from (mode Q) communication device 121-2 passing through or to the network server 191.

The application server 196-1 generates feedback F97-4 based on monitoring parameters Q7 (see FIG. 16) as specified by policy CP-Q-AS assigned to the application server 196-1 for communications from (mode Q) communication device 121-2 passing through or to the application server 196-1.

FIG. 16 is an example diagram illustrating different control functions applied by each of the different communication entities for devices operated in a quarantined mode according to embodiments herein.

In a similar manner as previously discussed, configuration settings 183-Q indicate the different parameters to be monitored by the corresponding entities in the network environment for generating corresponding feedback to the feedback management resource 145.

Figure 17:
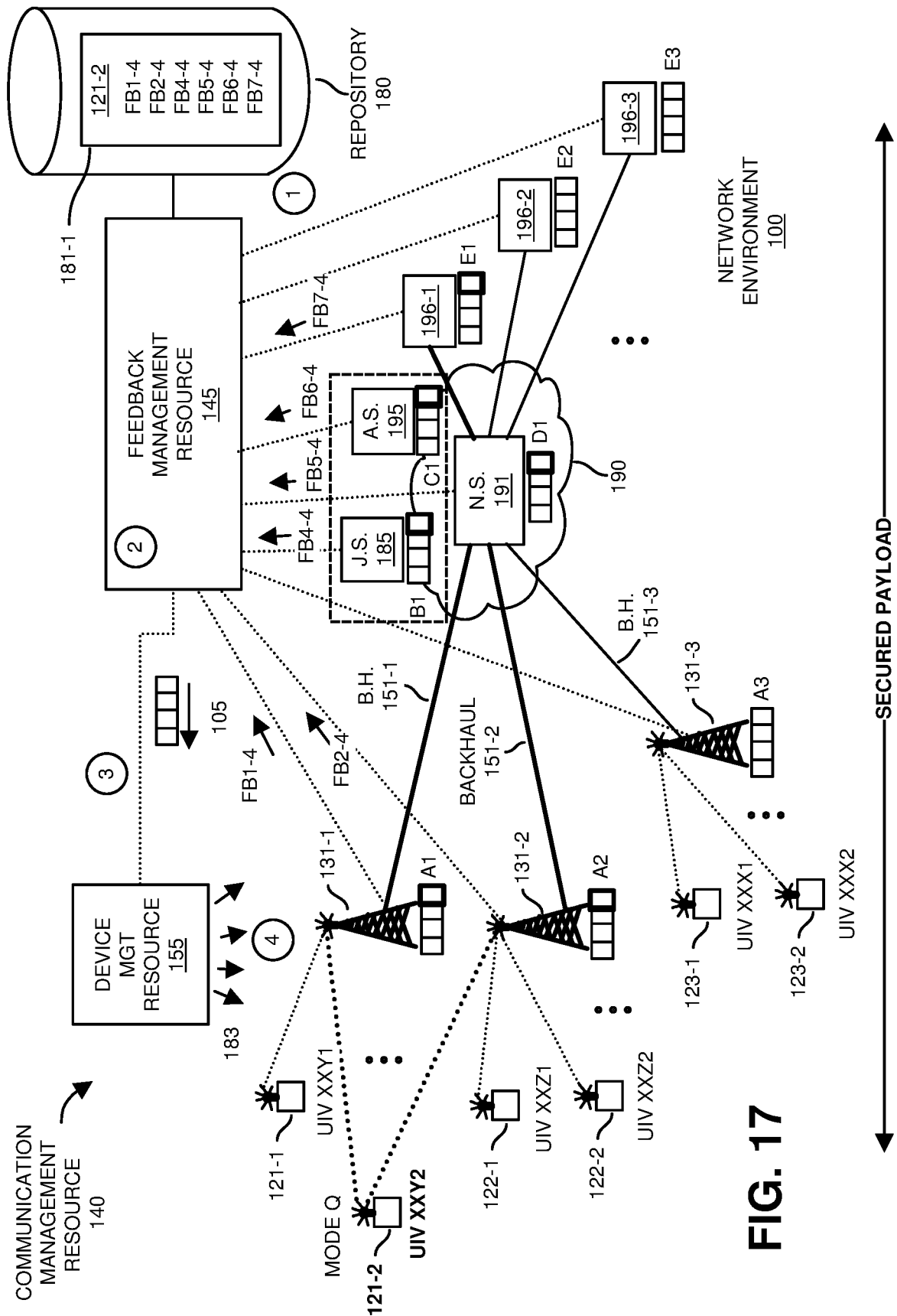
FIG. 17 is an example diagram illustrating collection of data associated with a respective communication device and forwarding of corresponding collected feedback information from each of multiple entities to a feedback management resource according to embodiments herein.

FIG. 17 is an example diagram illustrating collection of data associated with a respective communication device and forwarding of corresponding collected feedback information from each of multiple entities to a feedback management resource according to embodiments herein.

While the communication device 121-2 is set to the Q mode, each of the communication management entities in network environment 100 monitors communications associated with the communication device 121-2 and generates respective feedback communicated to the feedback management resource 145.

For example, based on implementation of policy CP-Q-GW associated with feedback/control configuration settings A1, the gateway 131-1 generates feedback FB1-4 based on monitored parameters Q1 associated with communications from the communication device 121-2 and communicates the feedback FB1-4 to the feedback management resource 145.

Based on implementation of policy CP-Q-GW associated with feedback/control configuration settings A2, the gateway 131-2 generates feedback FB2-4 based on monitored parameters Q1 associated with communications from the communication device 121-2 and communicates the feedback FB2-4 to the feedback management resource 145.

Based on implementation of policy CP-Q-JS associated with feedback/control configuration settings B1, the join server 185 generates feedback FB4-4 based on monitored parameters Q4 associated with communications from the communication device 121-2 and communicates the feedback FB4-4 to the feedback management resource 145.

Based on implementation of policy CP-Q-NS associated with feedback/control configuration settings D1, the network server 191 generates feedback FB5-4 based on monitored parameters Q5 associated with communications from the communication device 121-2 and communicates the feedback FB5-4 to the feedback management resource 145.

Based on implementation of policy CP-Q-SA associated with feedback/control configuration settings C1, the authentication server 195 generates feedback FB6-4 based on monitored parameters Q6 associated with communications from the communication device 121-2 and communicates the feedback FB6-4 to the feedback management resource 145.

Based on implementation of policy CP-Q-AS associated with feedback/control configuration settings E1, the application server 196-1 generates feedback FB7-4 based on monitored parameters Q7 associated with communications from the communication device 121-2 and communicates the feedback FB7-4 to the feedback management resource 145.

Figure 18:
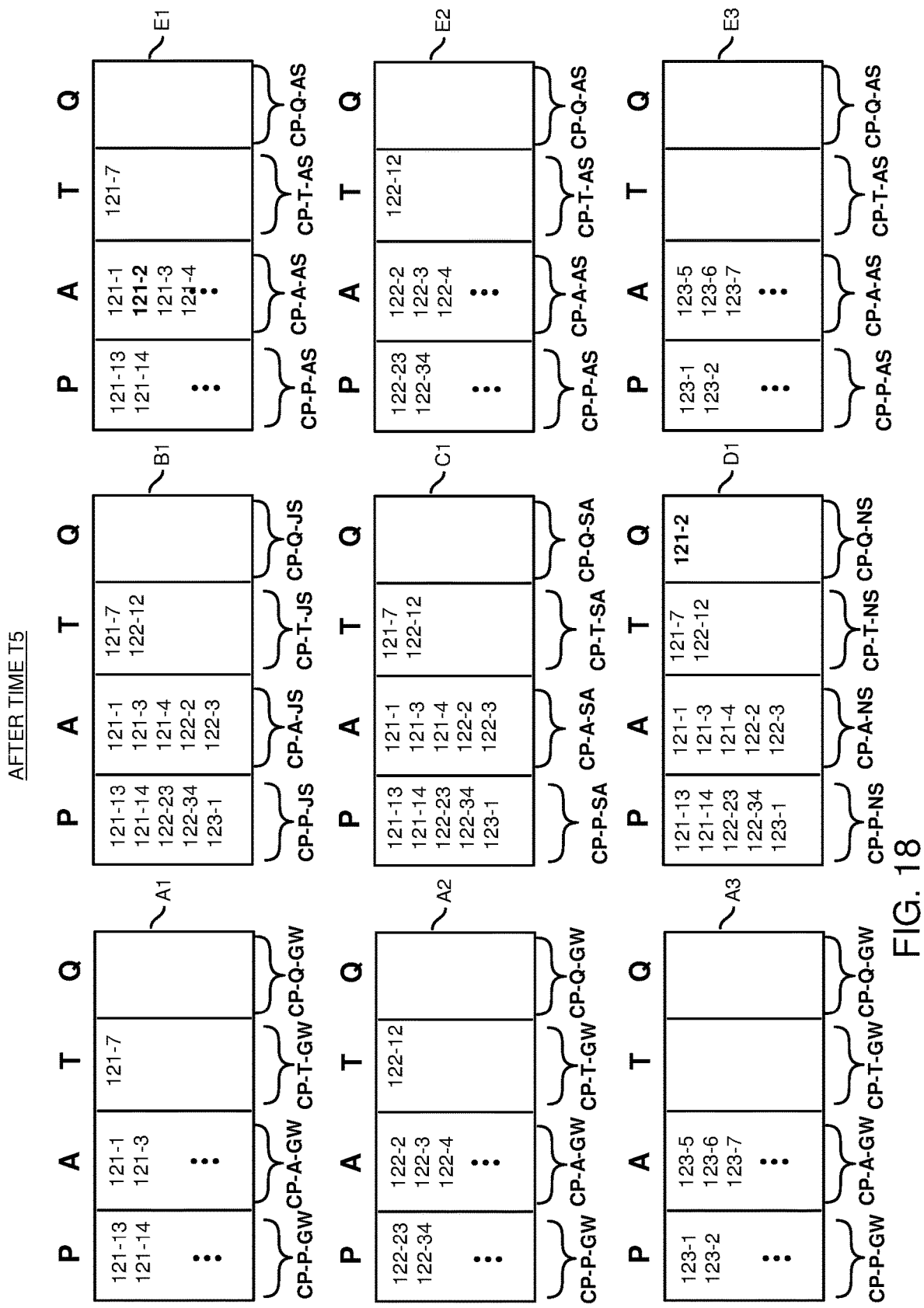
FIG. 18 is an example diagram illustrating termination of monitoring and providing feedback associated with a respective communication device subsequent to decommissioning of the communication device according to embodiments herein.

FIG. 18 is an example diagram illustrating termination of monitoring and providing feedback associated with a respective communication device subsequent to decommissioning of the communication device according to embodiments herein.

In this example embodiment, at or around time T5, the device management resource 155 terminates use of the communication device 121-2 in the network environment 100. In such an instance, because the communication device 121-2 has been decommissioned, the device management resource 155 removes the identity of the communication device 121-2 from each of the feedbacks/control configuration settings.

More specifically, the device management resource 155 removes the identity of the decommissioned/terminated communication device 121-2 from each of the feedback/control configuration settings A1, feedback/control configuration settings A2, feedback/control configuration settings A3, feedback/control configuration settings B1, feedback/control configuration settings C1; feedback/control configuration settings D1; feedback/control configuration settings E1; feedback/control configuration settings E2; feedback/control configuration settings E3; and so on.

Figure 19:
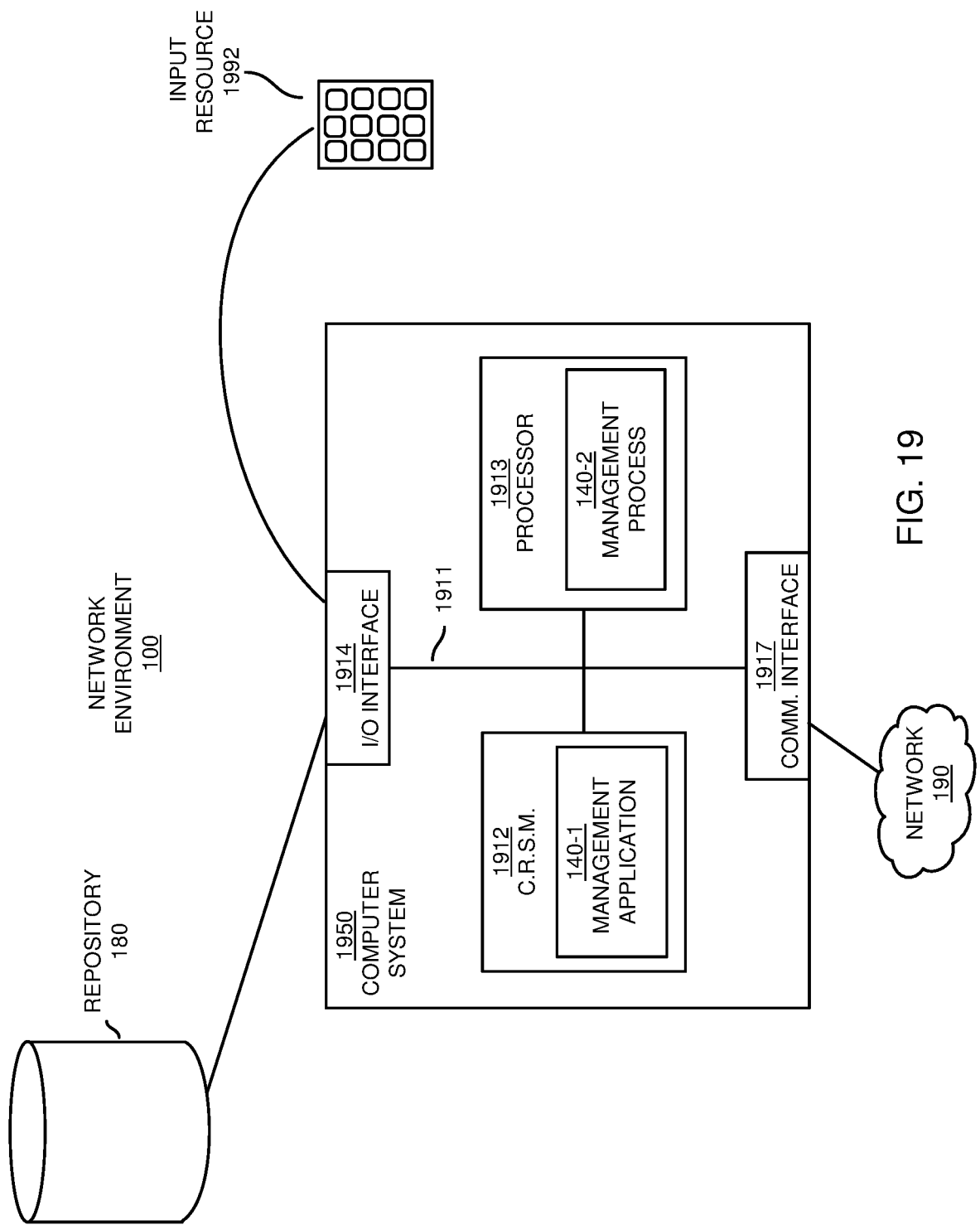
FIG. 19 is an example diagram illustrating example computer hardware and software operable to execute operations according to embodiments herein.

FIG. 19 is an example block diagram of a computer system for implementing any of the operations as previously discussed according to embodiments herein.

Note that any of the resources (such as communication management resource 140, feedback management resource 145, device management resource 155, gateway, join server 185, authentication server 195, network server 191, application server 196, etc.) as discussed herein can be configured to include computer processor hardware and/or corresponding executable instructions to carry out the different operations as discussed herein.

For example, as shown, computer system 1950 of the present example includes interconnect 1911 coupling computer readable storage media 1912 such as a non-transitory type of media (which can be any suitable type of hardware storage medium in which digital information can be stored and or retrieved), a processor 1913 (computer processor hardware), I/O interface 1914, and a communications interface 1917.

I/O interface(s) 1914 supports connectivity to repository 1980 and input resource 1992.

Computer readable storage medium 1912 can be any hardware storage device such as memory, optical storage, hard drive, floppy disk, etc. In one embodiment, the computer readable storage medium 1912 stores instructions and/or data.

As shown, computer readable storage media 1912 can be encoded with management application 140-1 including instructions) in a respective wireless station to carry out any of the operations as discussed herein.

During operation of one embodiment, processor 1913 accesses computer readable storage media 1912 via the use of interconnect 1911 in order to launch, run, execute, interpret or otherwise perform the instructions in management application 140-1 stored on computer readable storage medium 1912. Execution of the management application 140-1 produces management process 140-2 to carry out any of the operations and/or processes as discussed herein.

Those skilled in the art will understand that the computer system 1950 can include other processes and/or software and hardware components, such as an operating system that controls allocation and use of hardware resources to execute the management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1950 may reside at any location or can be included in any suitable resource in any network environment to implement functionality as discussed herein.

Functionality supported by the different resources will now be discussed via flowcharts in FIG. 20. Note that the steps in the flowcharts below can be executed in any suitable order.

FIG. 20 is a flowchart 2000 illustrating an example method according to embodiments herein. Note that there will be some overlap with respect to concepts as discussed above.

In processing operation 2010, the communication management resource 140 detects an event associated with a first communication device 121-2 such as based on analysis of first feedback from multiple network entities supporting conveyance of communications associated with the first communication device 121-2.

In processing operation 2020, the communication management resource 140 selects an operational state of the first communication device 121-2 based on the detected event.

In processing operation 2030, the communication management resource 140 notifies each of the multiple network entities of the selected operational state of the first communication device.

Further Example Embodiments

In one embodiment, as further discussed below, the communication management resource 140 (such as Artificial Intelligence or Machine Learning entity or the feedback management resource 145) collects the metrics (associated with parameters that are monitored) and analyzes them in a continuous manner and identifies potential anomalies.

The communication management resource 140 (such as device management resource 155 or other suitable entity) can be configured to determine the sequence of corrective actions and/or additional diagnostics (such as tests or commands) to be executed by each of the individual network functions to gather and forward respective diagnostic information to the device management resource 155 and/or feedback management resource 145 for a specific device (such as communication device 121-2) of interest.

For example, the device management resource 155 can be configured to perform transitioning of the operational state of a given device as needed.

The device management resource 155 can be configured to send instructions for each network function (such as communication management entity in a respective path) as to how to act for a specific device The instructions sent to each of the Network Functions (such as communication management entities) may be different, the timing may also be different. In one implementation, the sequence and timing of executing respective instructions sent to different network functions are critical.

For all scenarios, note that all network functions may not be needed to participate in the corrective action of a respective communication device in the troubleshoot mode. Some network functions may need only provide additional diagnostics information.

Scenario-1 (Transition of Device from Active Mode A to Troubleshoot/Debug Mode T)

Problem: End communication device 121-2 (such as a water meter or other type of entity) is sending packets at fewer intervals. For example, instead of sending 5 times every hour, the communication device 121-2 sends collected data to the corresponding application server 196-1 only 3 times every hour. This corresponds to a fault condition.

Diagnosis: The feedback management resource 145 (such as AI/ML) engine collects metrics from the different elements (Gateway 131-1, Gateway 131-2, network server 191, join server 185, and application server 196-1) and detects the anomaly (that is, fault condition).

Device Manger: In such an instance, the device management resource 155 moves the communication device 121-2 to the troubleshoot-debug mode T list. The device management resource 155 communicates the operational state change to each of the communication management entities (Gateway 131-1, Gateway 131-2, network server 191, joined server 185, and application server 196-1)

Actions Taken:

GW: The communication device 121-2 is put in the troubleshoot mode T. Thus, it's action changes from normal active operational state to the troubleshoot mode T state. Now, instead of just forwarding packets, the respective gateway 131 adds metadata related to monitoring additional parameters such as RF, SINR, wireless receive level of communications from the communication device 121-2, Packet size and then forwards such newly monitored parameters associated with communications from the communication device 121-2 to the feedback management resource 145. This information will help the feedback management resource 145 to determine whether it is a change in radio characteristics that is the reason for fewer packets.

NS: When in the troubleshoot mode T, the network server 191 checks the device profiles that are configured and compares with a good backup copy. For example, if somehow the device profile associated with the communication device 121-2 was changed/corrupted, then the network server 191 could limit the data rate and frequency from end devices, hence allowing fewer packets. The network several 91 or other entity restores or updates the RF profile of the communication device 121-1 as is appropriate.

AS: When in in the troubleshoot mode T, the application server 196-1 sends additional data to the feedback management resource 145 such as information regarding software loads. If the decision is that software in the communication device 121-2 is corrupted, the application server 196-1 communicates a new update of software to be executed by the communication device 121-2 over the respective network 190 through a gateway to reconfigure software operation of the communication device 121-2.

Scenario-2 (Device State Transition from Troubleshoot Mode T to Active Load A)

Current state: Assume that the communication device 121-2 is currently in the troubleshoot mode T and the corrective action as described above is implemented by different network functions.

Diagnosis: The feedback management resource 145 (such as AI/ML engine) collects metrics from the different elements (gateway 131-1, gateway 131-2, network server 191, join server 185, application server 196-1, etc.), detects that the communication device 121-2 has begun to function properly again according to its device profile. In such an instance, the feedback management resource 145 or other suitable entity communicates the new device state (active mode A) to the device management resource 155.

Device Manger: Operation of the communication device 121-2 is moved to active mode A. The device management resource 155 communicates instructions regarding the change in the operational mode associated with communication device 121-2 to each of the network server 191, gateway 131-1, gateway 131-2, application server 196-1, join server 185, etc.

Actions Taken:

GW: The gateway 131-1 resumes normal operation (such as active mode A) for the device and stops collecting additional Radio related metrics for the device as previously discussed.

NS: The network server 191 ensures that operation of the communication device 121-2 complies with configured profile from reachability, redundant connectivity to the devices and radio aspects of the connectivity are within norms defined. Once satisfied with the current state of device, the network server 191 or other suitable entity provides the corresponding state metrics to the feedback management resource 145.

AS: The application server 196-1 resumes resume normal processing of the data as stipulated for the given application based on operation of the communication device 121-2 and the active mode A.

Scenario-3 (Device State Transition from Troubleshoot Mode T to Quarantine Mode Q)

Current state: Assume that the communication device 121-2 is currently in the troubleshoot mode T and the corrective action as described above is taken by different network functions Diagnosis: The device management resource 155 collects metrics from the different elements (GW, NS, JS, AS), and detects the communication device 121-2 has not restored to normal state the functionality has further deteriorated (e.g. more packet drops, data corrupted in received packets, radio aspect indicate further weaker radio signals etc.)

Device Manger: The device management resource 155 moves the identity of the communication device 121-2 to the quarantine list to operate the communication device 121-2 in the quarantined mode Q. The device management resource 155 sends instructions to each of the communication management entities such as AS (application server 196-1), NS (network server 191), GW, (Gateway 131-1, Gateway 131-2) and JS. (Join server 185) regarding the change in status. In one embodiment, the sequence and timing of communicating and/or executing these instructions by the different network functions (communication management entities) may be critical.

Actions Taken:

AS: The application server 196-1 tries to restart the device at application level. The application server 196-1 does not use or trust any data received from the communication device 121-2.

NS: The network server 191 marks the communication device 121-2 as not operational and any received data from the communication device 121-2 is discarded JS: the join server 185 declines the join request from the communication device 121-2.

GW: The gateways 131 do not accept or forward any packets from the communication device 121-2 as instructed by the device management resource 155.

Note again that techniques herein are well suited to facilitate processing of available physical infrastructure information and generation of a proposed wireless network installation plan for implementation of the new wireless network. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    detecting an event associated with a first communication device the event detected based upon first feedback received from multiple network entities in a network, the multiple network entities collectively supporting conveyance of first communications transmitted by the first communication device through the network;
    selecting an operational state of the first communication device based on the detected event; and
    notifying each of the multiple network entities of the selected operational state of the first communication device.

2. The method as in claim 1, wherein the selected operational state controls a type of second feedback collected and communicated from the multiple network entities in the network to a device management resource managing operation of the first communication device the second feedback generated by the multiple network entities based on monitoring a set of parameters assigned to the selected operational state.

3. The method as in claim 1, wherein the multiple network entities in the network include a wireless gateway and a network server providing communication connectivity between the first communication device and an application server managing data generated by the first communication device, the data communicated in the first communications conveyed through the network.

4. The method as in claim 3, wherein the notification of the selected operational state of the first communication device causes each of the wireless gateway resource and the network server to collect and report a particular type of second feedback to a device management resource managing operation of the first communication device, the particular type of second feedback assigned to the selected operational state.

5. The method as in claim 1, wherein the selected operational state is a troubleshoot mode selected in response to detecting the event associated with the first communication device.

6. The method as in claim 5 further comprising:
during the troubleshoot mode, testing operation of the first communication device receiving second feedback from the multiple network entities; and
in response to detecting an inability to correct a failure associated with the first communication device based on the received feedback from the multiple network entities during the troubleshoot mode, deactivating the first communication device.

7. The method as in claim 5 further comprising:
in response to detecting an inability to correct a failure associated with the first communication device via the troubleshoot mode notifying each of the multiple network entities in the network of a condition in which the first communication device has been deactivated.

8. The method as in claim 1, wherein, subsequent to the notifying, each of the multiple network entities in the network provides second feedback to a feedback management resource depending on the selected operational state of the first communication device.

9. The method as in claim 1, wherein notifying each of the network entities of the selected operational state of the first communication device includes:
notifying a join server of the selected operational state, the join server being one of the multiple network entities, the join server operative to control connectivity of the first communication device to an application server in the network.

10. The method as in claim 1, wherein the event is a first anomaly event;
wherein the multiple network entities represent a first set of network entities, the method further comprising:
detecting a second anomaly event associated with a second communication device based on analysis of second feedback from a second set of multiple network entities in the network the second set of multiple network entities supporting conveyance of second communications associated with the second communication device through the network;
selecting an operational state of the second communication device based on the detected second anomaly event; and
notifying each of the multiple network entities in the second set of the selected operational state of the second communication device, the selected operational state of the second communication device different than the selected operational state of the first communication device.

11. A system comprising:
a communication management resource operative to:
detect an event associated with a first communication device, the event detected based upon feedback received from multiple network entities in a network, the multiple network entities collectively supporting conveyance of first communications transmitted by the first communication device through the network;
select an operational state of the first communication device based on the detected event; and
notify each of the multiple network entities of the selected operational state of the first communication device.

12. The system as in claim 11, wherein the selected operational state controls a type of feedback collected and communicated from the multiple network entities to a device management resource managing operation of the first communication device.

13. The system as in claim 11, wherein the multiple network entities include a wireless gateway and a network server providing communication connectivity between the first communication device and an application server managing data generated by the first communication device.

14. The system as in claim 13, wherein the notification of the selected operational state of the first communication device causes each of the wireless gateway resource and the network server to collect and report a particular type of feedback to a device management resource managing operation of the first communication device.

15. The system as in claim 11, wherein the selected operational state is a troubleshoot mode selected in response to detecting the event associated with the first communication device.

16. The system as in claim 15, wherein the communication management resource is further operative to:
during the troubleshoot mode, test operation of the first communication device; and
in response to detecting an inability to correct a failure associated with the first communication device during the troubleshoot mode, deactivate the first communication device.

17. The system as in claim 15, wherein the communication management resource is further operative to:
in response to detecting an inability to correct a failure associated with the first communication device, notify each of the multiple network entities of a condition in which the first communication device has been deactivated.

18. The system as in claim 11, wherein the multiple network entities provide different feedback to a feedback management resource depending on the selected operational state of the first communication device.

19. The system as in claim 11, wherein the communication management resource is further operative to:
notify a join server of the selected operational state, the join server operative to control connectivity of the first communication device to an application server.

20. The system as in claim 11, wherein the event is a first anomaly event;
wherein the multiple network entities represent a first set of network entities, the communication management resource further operative to:
detect a second anomaly event associated with a second communication device based on analysis of second feedback from a second set of multiple network entities supporting conveyance of second communications associated with the second communication device;
select an operational state of the second communication device based on the detected second anomaly event; and
notify each of the multiple network entities in the second set of the selected operational state of the second communication device.

21. Computer-readable storage hardware having instructions stored thereon, the instructions, when carried out by computer processor hardware, cause the computer processor hardware to:
detect an event associated with a first communication device, the event detected based upon first feedback received from multiple network entities in a network, the multiple network entities collectively supporting conveyance of first communications transmitted by the first communication device through the network;
select an operational state of the first communication device based on the detected event; and
notify each of the multiple network entities of the selected operational state of the first communication device.

22. The method as in claim 1 further comprising:
based on the selected operational state of the first communication device, communicating commands to the multiple network entities in the network, the commands communicated to control collection and conveyance of second feedback from the multiple network entities to a communication management resource managing testing of the first communication device.

23. The method as in claim 22, wherein the communicated commands include a corresponding diagnostic test communicated to a first network entity of the multiple network entities for execution, the method further comprising:
in response to communicating the diagnostic test to the first network entity, receiving diagnostic data from the first network entity, the diagnostic data including collection of data associated with the first communication device.

24. The method as in claim 1 further comprising:
based on the selected operational state of the first communication device, communicating commands to the multiple network entities in the network, the communicated commands controlling operation of the multiple network entities with respect to conveyance of second communications associated with the first communication device through the network of multiple network entities.

25. The method as in claim 1, wherein the feedback is a first set of feedback messages including a first feedback message and a second feedback message, the method further comprising:
receiving the first feedback message from a first network entity of the multiple network entities;
receiving the second feedback message from a second network entity of the multiple network entities; and
detecting the event based on a combination of the first feedback and the second feedback.

26. The method as in claim 25, wherein the detected event is an anomaly event, the anomaly event occurring based on failure of the first communication device.

27. The method as in claim 26, wherein the selected operational state is a troubleshoot mode, the method further comprising:
in response to notifying each of the multiple network entities of the selected operational state of the first communication device, receiving a second set of feedback messages from the multiple network entities during the troubleshoot mode, the second set of feedback messages generated by the multiple network entities monitoring second communications transmitted by the first communication device through the network.

28. The method as in claim 1, wherein the first feedback received from the multiple network entities is based on operation of the first communication device in a first operational state of multiple operational states;
wherein the selected operational state is a second operational state of the multiple operational states; and
wherein the first feedback is based on a first monitor mode implemented by the multiple network entities to produce the first feedback.

29. The method as in claim 28 further comprising:
in response to notifying each of the multiple network entities of the selected operational state of the first communication device, receiving second feedback from the multiple network entities; and
wherein the second feedback is based on a second monitor mode implemented by the multiple network entities to produce the second feedback.

30. The method as in claim 29, wherein the first monitor mode is assigned to the first operational state; and
wherein the second monitor mode is assigned to the second operational state.

31. The method as in claim 1, wherein notifying each of the multiple network entities of the selected operational state of the first communication device includes: i) transmitting a first control notification to a first network entity of the multiple network entities, the first control notification indicating the selected operational state of the first communication device, the transmitted first control notification causing the first network entity to implement a first monitor mode of monitoring second communications transmitted by the first mobile communication device through the network of multiple network entities; and ii) transmitting a second control notification to a second network entity of the multiple network entities, the second control notification indicating the selected operational state of the first communication device, the transmitted second control notification causing the second network entity to implement a second monitor mode of monitoring the second communications transmitted by the first mobile communication device through the network of multiple network entities.

32. The method as in claim 1 further comprising:
controlling the first communication device to operate in the selected operational state.

33. The method as in claim 32, wherein the notification to each of the multiple network entities of the selected operational state of the first communication device causes the multiple network entities to implement a corresponding monitor mode assigned to the selected operational state.

34. The method as in claim 2 further comprising:
receiving the second feedback from the multiple network entities, the second feedback generated by the multiple network entities via the multiple network entities monitoring conveyance of second communications transmitted by the first communication device through the network during operation of the first communication device in the selected operational state.

* * * * *

UNITED STATES PATENT AND TRADEMARK OFFICE
CERTIFICATE OF CORRECTION

| | | |
|---|---|---|
| PATENT NO. | : 12,160,758 B2 | Page 1 of 1 |
| APPLICATION NO. | : 17/688014 | |
| DATED | : December 3, 2024 | |
| INVENTOR(S) | : Hossam H. Hmimy, Umamaheswar A. Kakinada and Muhammad J. Khan | |

It is certified that error appears in the above-identified patent and that said Letters Patent is hereby corrected as shown below:

In the Claims

Claim 1, Line 3, replace "device" with --device,--
Claim 2, Line 5, replace "device" with --device,--
Claim 6, Line 3, replace "device" with --device;--
Claim 10, Line 8, replace "network" with --network,--

Signed and Sealed this
Eleventh Day of February, 2025

Coke Morgan Stewart
*Acting Director of the United States Patent and Trademark Office*